US010695848B2

(12) United States Patent
Gehret

(10) Patent No.: US 10,695,848 B2
(45) Date of Patent: Jun. 30, 2020

(54) SAW WITH INCREASED DEPTH OF CUT

(71) Applicant: Black & Decker Inc., Newark, DE (US)

(72) Inventor: Robert S. Gehret, Hampstead, MD (US)

(73) Assignee: BLACK & DECKER INC., New Britain, CT (US)

( * ) Notice: Subject to any disclaimer, the term of this patent is extended or adjusted under 35 U.S.C. 154(b) by 1239 days.

(21) Appl. No.: 14/252,387

(22) Filed: Apr. 14, 2014

(65) Prior Publication Data

US 2014/0245621 A1 Sep. 4, 2014

Related U.S. Application Data

(62) Division of application No. 12/208,060, filed on Sep. 10, 2008, now Pat. No. 8,695,224.

(60) Provisional application No. 60/993,564, filed on Sep. 13, 2007.

(51) Int. Cl.
*B23D 45/16* (2006.01)
*B23D 47/12* (2006.01)
*B27B 9/02* (2006.01)

(52) U.S. Cl.
CPC ............. *B23D 45/16* (2013.01); *B23D 47/12* (2013.01); *B23D 47/123* (2013.01); *B23D 47/126* (2013.01); *B27B 9/02* (2013.01)

(58) Field of Classification Search
CPC ...... B23D 45/16; B23D 47/12; B23D 47/123; B23D 47/126; B27B 9/02
USPC ...................... 30/388–391, 521; 83/478, 490
See application file for complete search history.

(56) References Cited

U.S. PATENT DOCUMENTS

| | | | | |
|---|---|---|---|---|
| 1,806,528 | A * | 5/1931 | Fegley et al. | 30/377 |
| 4,856,394 | A * | 8/1989 | Clowers | 83/56 |
| 5,010,651 | A * | 4/1991 | Techter et al. | 303/76 |
| 5,933,969 | A * | 8/1999 | Houben et al. | 30/390 |
| 6,026,909 | A * | 2/2000 | Hon | B23D 45/16 173/162.1 |
| 6,148,526 | A * | 11/2000 | Kirn et al. | 30/388 |
| 7,207,115 | B2 * | 4/2007 | Otake | 30/391 |
| 7,685,914 | B2 * | 3/2010 | Friel, Sr. | 83/707 |
| 7,739,801 | B1 * | 6/2010 | Crain et al. | 30/371 |
| 7,739,802 | B2 * | 6/2010 | Crain et al. | 30/371 |
| 7,861,417 | B2 * | 1/2011 | Tanimoto et al. | 30/391 |
| 2010/0192389 | A1 * | 8/2010 | Okada et al. | 30/374 |
| 2010/0269353 | A1 * | 10/2010 | Martin | 30/124 |
| 2011/0167651 | A1 * | 7/2011 | Tokunaga et al. | 30/388 |
| 2011/0185581 | A1 * | 8/2011 | Xing et al. | 30/374 |
| 2011/0239472 | A1 * | 10/2011 | Parks | 30/391 |

OTHER PUBLICATIONS

Declaration of Kenneth Peterson, Jan. 30, 2020.*

* cited by examiner

*Primary Examiner* — Omar Flores Sanchez
(74) *Attorney, Agent, or Firm* — Michael Aronoff

(57) ABSTRACT

A circular saw includes a housing assembly and a drive motor assembly coupled to the housing assembly. An output member is driven by the drive motor assembly. A shoe is adjustably mounted to the housing assembly. A circular saw blade has a diameter of about 7.3 inches. The shoe can be adjusted to provide a depth of cut that is greater than or equal to about 3.0 inches.

9 Claims, 25 Drawing Sheets

301 84 302 304 102 300 76 16 84

74
202
216
210
212
226
224

84
16
301
304
76
302
102
300
84

10e
36e
702
820
80
16

14g
852
850
866
870
860
862
872
866
856
68
22
76
18g

SAW WITH INCREASED DEPTH OF CUT

CROSS-REFERENCE TO RELATED APPLICATIONS

This application claims the benefit of U.S. patent application Ser. No. 12/208,060, filed on Sep. 10, 2008, which claims the benefit of U.S. Provisional Application No. 60/993,564, filed on Sep. 13, 2007. The entire disclosure of the above application is incorporated herein by reference.

INTRODUCTION

The present disclosure generally relates to circular saws and more particularly to a circular saw having a relatively deeper depth of cut capability.

Circular saws configured for a 7.25 inch blade typically have a depth of cut of approximately 2.38 inches. Their depth of cut can be limited by many factors such as the size of the washers that are employed to secure the saw blade to the output spindle of the circular saw, and/or to the size and/or location of the gear reduction of the circular saw.

SUMMARY

A circular saw includes a housing assembly and a drive motor assembly coupled to the housing assembly. An output member is driven by the drive motor assembly. A shoe is adjustably mounted to the housing assembly. A circular saw blade has a diameter of about 7.3 inches. The shoe can be adjusted to provide a depth of cut that is greater than or equal to about 3.0 inches.

According to additional features, the output member defines an output gear that is rotatably supported relative to the housing assembly. The output gear has a first end adjacent to the circular saw blade and a second end opposite the circular saw blade. A first bearing rotatably supports the first end of the output gear and a second bearing rotatably supports the second end of the output gear. In one configuration, the first bearing is a needle bearing. The output member collectively defines an output gear and an integrally formed output spindle. The circular saw blade is fixed for rotation to the output spindle. The output gear defines an outer diameter and the first bearing defines an inner diameter. The outer diameter of the output gear is less than the inner diameter of the first bearing. The output member is supported within a gear case of the housing assembly. A distal end of the gear case defines a nose. The nose is adapted to be at least partially received within an aperture formed through the shoe.

According to other features, the drive motor assembly defines an intermediate spindle that is rotatably driven by the drive motor and supported by a gear case of the housing assembly. The drive motor assembly includes a belt that transfers rotatable motion from the intermediate spindle to rotatable motion of the output member. A diameter of the intermediate spindle in which the belt rides is substantially equivalent to a diameter of the output member in which the belt rides. The output member is rotatably supported on a first end by a first bearing supported by the gear case and rotatably supported on a second end by a second bearing supported by the gear case. The belt engages the output member at an area of the output member intermediate of the first and second ends.

In other features, the drive motor assembly includes a motor, a motor output shaft extending from the motor and an intermediate shaft. The motor output shaft has a first worm gear. The intermediate shaft has a second worm gear and an intermediate shaft gear. The output member has an output gear. The first worm gear is meshed for rotation with the second worm gear. The intermediate shaft gear is meshed for rotation with the output gear. The intermediate shaft defines an axis that is substantially transverse to an axis defined by the motor output shaft. The intermediate axis, according to one example, is configured to rotate less that 1 revolution for every 1 revolution of the saw output shaft. The motor output shaft, according to one example, is configured to rotate about 5 times for every 1 revolution of the output member. A first gear ratio of the first and second worm gears, according to one example, is greater than a second gear ratio of the intermediate shaft gear and the output gear. In one configuration, the first worm gear has 1 worm start and the second worm gear has about 19 worm teeth. In one configuration, the intermediate shaft gear has about 44 teeth and the output gear has about 11 teeth.

According to still other features, the drive motor assembly comprises a motor that drives an output roller. The output roller rotatably engages a first planar side surface of the circular saw blade for imparting a rotational motion onto the circular saw blade about a rotational axis of the circular saw blade. The output roller directly engages the first planar side surface of the circular saw blade. A reaction roller is rotatably disposed against a second planar side surface of the circular saw blade opposite the first planar surface. At least one of the output roller and reaction roller is biased into engagement with the circular saw blade.

BRIEF DESCRIPTION OF THE DRAWINGS

The drawings described herein are for illustration purposes only and are not intended to limit the scope of the present disclosure in any way.

DETAILED DESCRIPTION OF THE VARIOUS EMBODIMENTS

Figure 1:
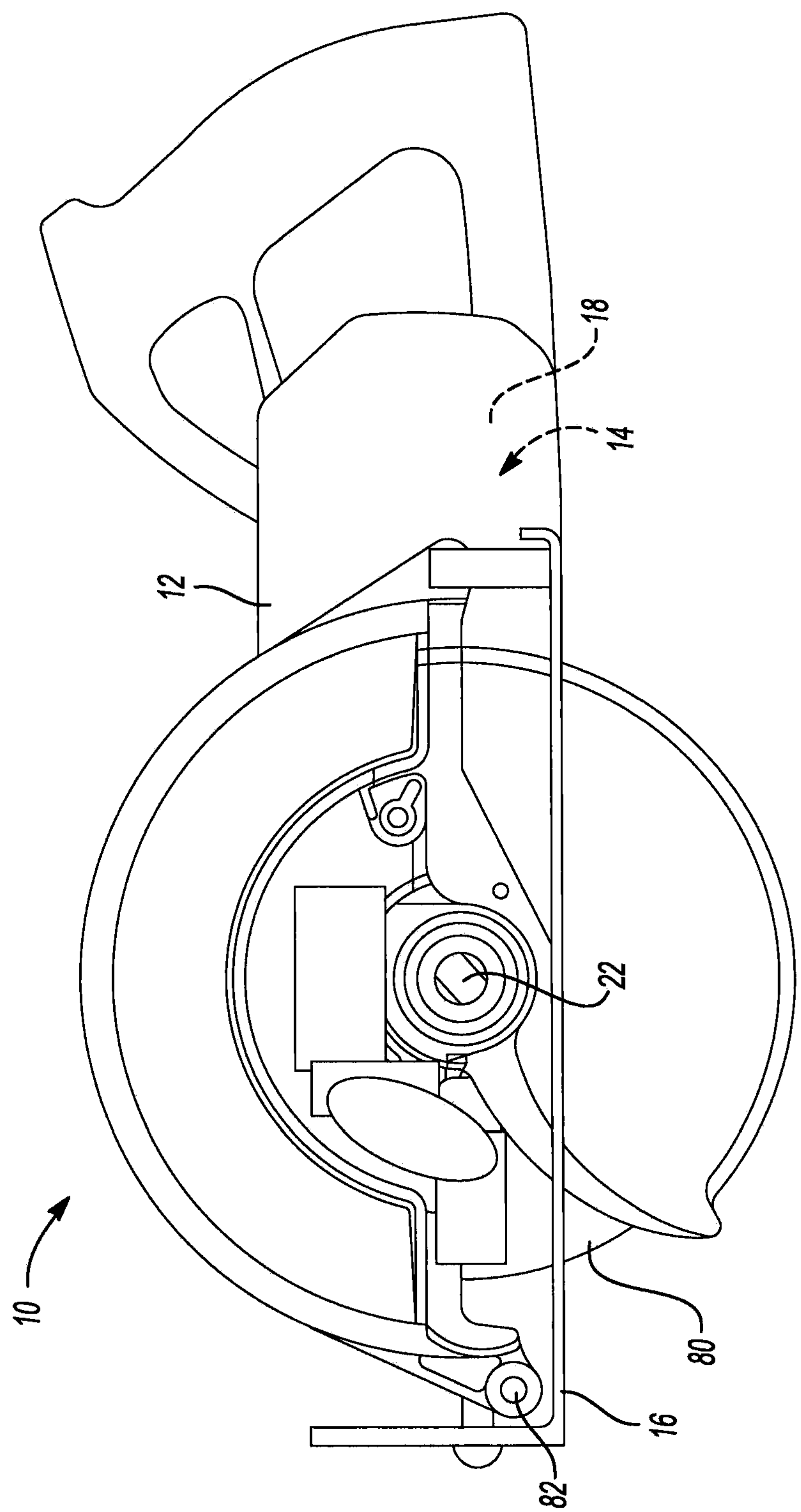
FIG. 1 is a side elevation view of a circular saw constructed in accordance with the teachings of the present disclosure.
Figure 2:
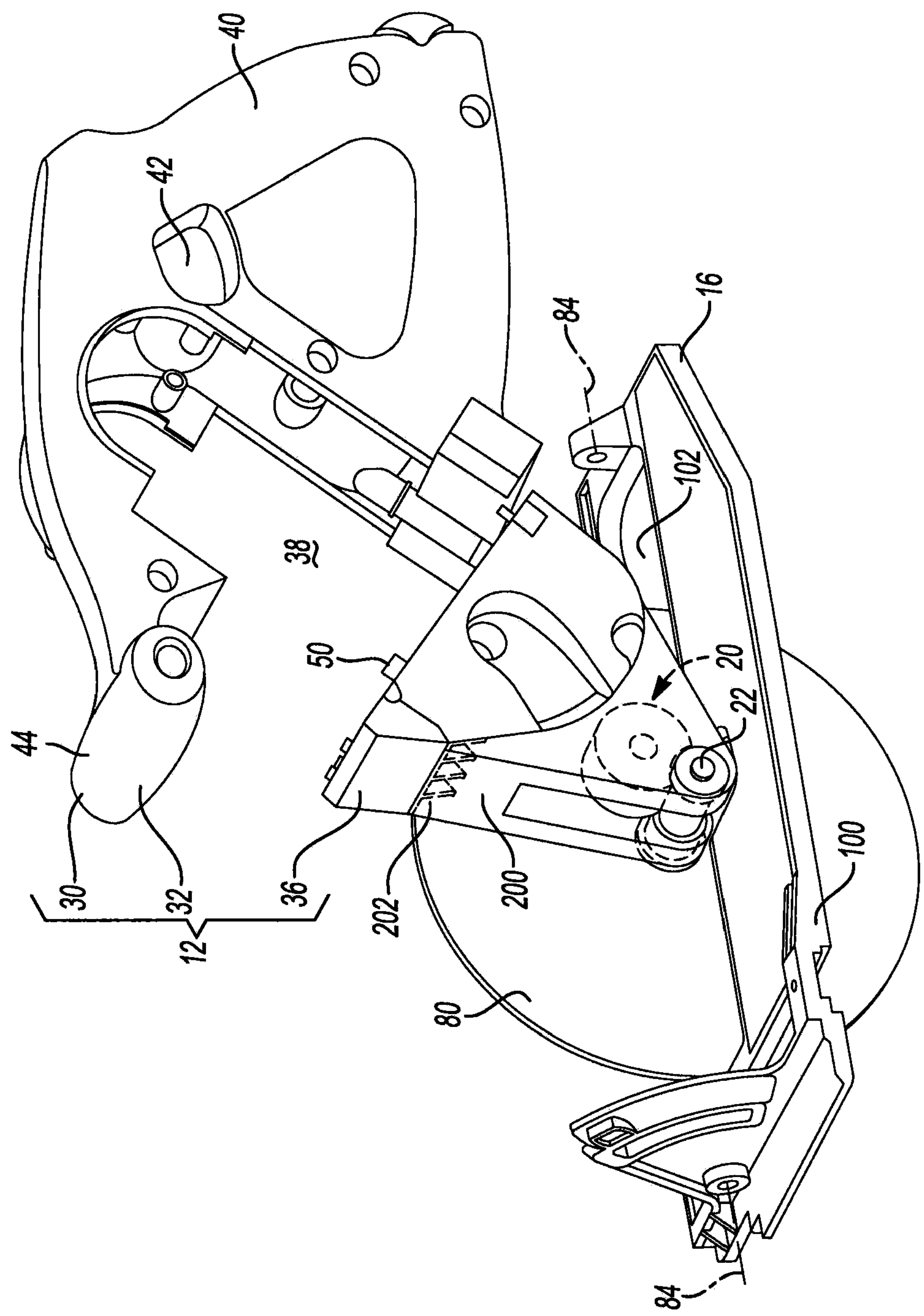
FIGS. 2 and 3 are perspective views of a portion of the circular saw of FIG. 1.

With reference to FIGS. 1 and 2 of the drawings, a portion of a circular saw constructed in accordance with the teachings of the present disclosure is generally indicated by reference numeral 10. The circular saw 10 can include a housing assembly 12, a drive motor assembly 14 and a shoe 16. The drive motor assembly 14 can include a motor 18, a transmission 20, and an output spindle 22.

The housing assembly 12 can include first and second shell members 30 and 32, respectively, and a gear case 36. The first and second shell members 30 and 32 can cooperate to define an interior cavity 38, a primary handle 40, a trigger aperture 42, and a secondary handle 44. In the particular example provided, the circular saw 10 is a "corded" tool that is adapted to be coupled via an electric cord (not shown) to a source of electrical power. It will be appreciated that the circular saw 10 could additionally or alternatively be powered by a source of DC electric power and that in such case, the first and second shell members 30 and 32 could also cooperate to define a battery connection portion (not shown) onto and/or into which a rechargeable battery pack (not shown) can be removably coupled. The motor 18, as well as other conventional and well known components of a generic circular saw, such as a trigger assembly (not specifically shown), can be received in the cavity 38. The gear case 36 can be removably coupled to the first and second shell members 30 and 32. Dowels 50 can be employed to precisely locate the motor 18 and/or the first and second shell members 30 and 32 to the gear case 36. The gear case 36 can be formed of an appropriate material, such as a reinforced plastic or a relatively light metal, such as aluminum or magnesium, and can serve as a platform to which the motor 18 and the transmission 20 can be coupled.

Figure 3:
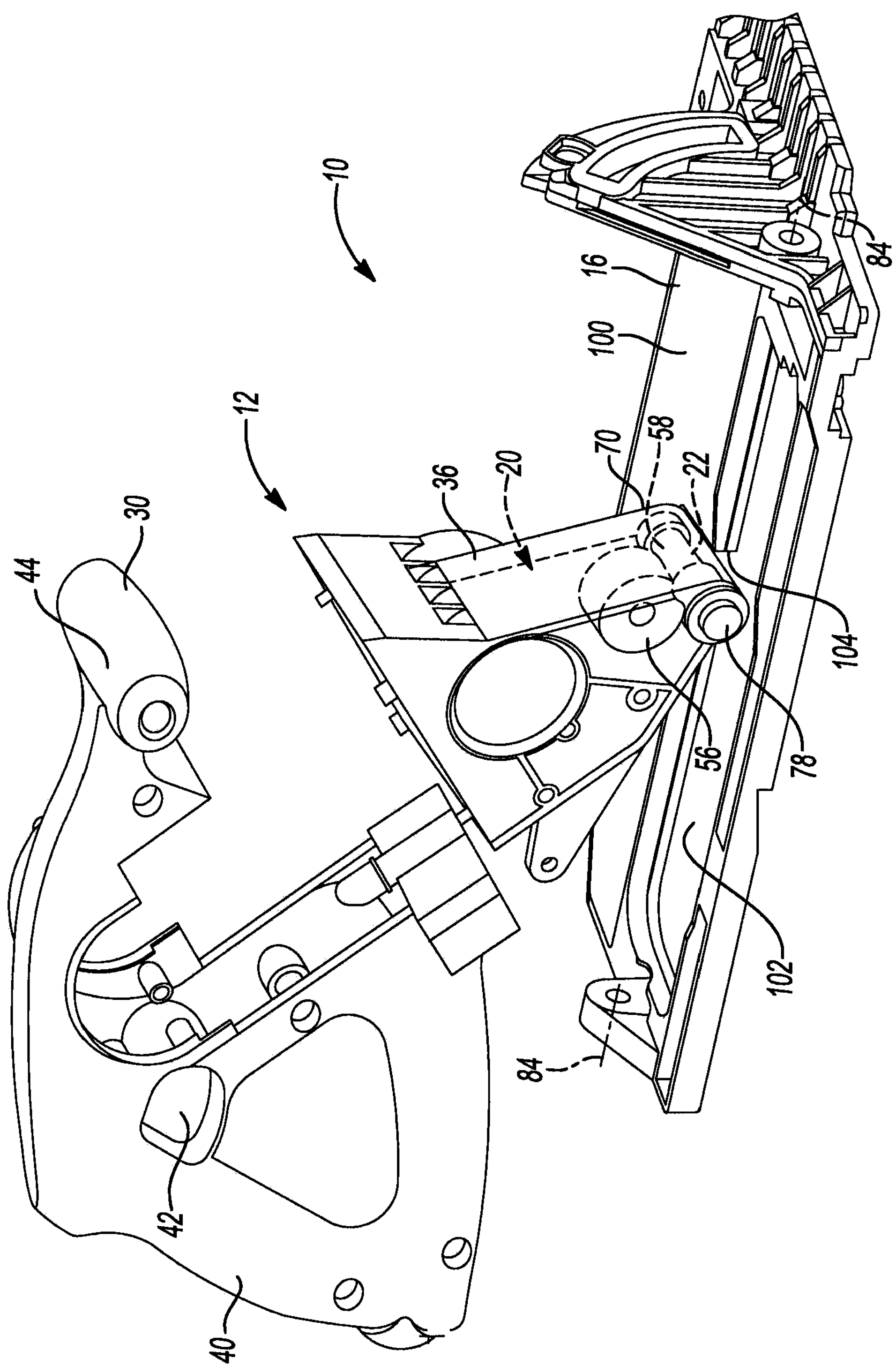
Figure 4:
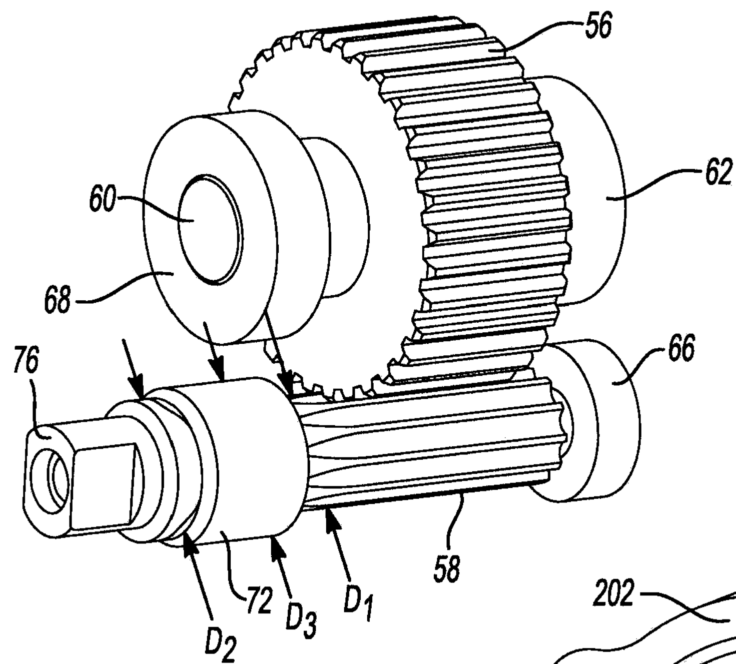
FIG. 4 is a perspective view of a portion of the circular saw of FIG. 1 illustrating the driven gear and the output spindle in more detail.
Figure 5:
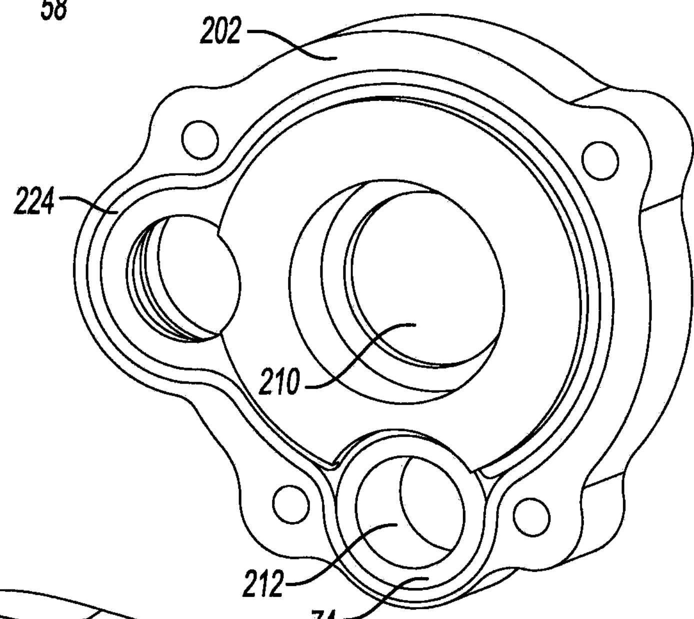
FIG. 5 is a perspective view of a portion of the circular saw of FIG. 1, illustrating a portion of the gear case in more detail.
Figure 6:
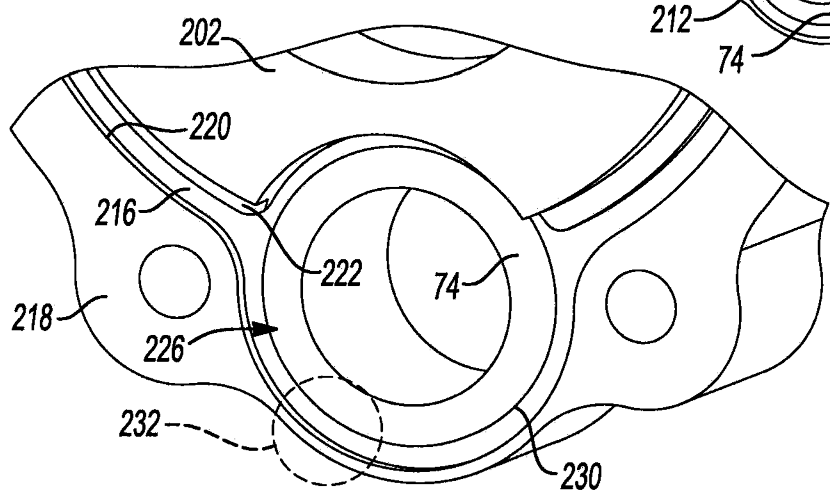
FIG. 6 is an enlarged portion of FIG. 5 with a seal removed.
Figure 7:
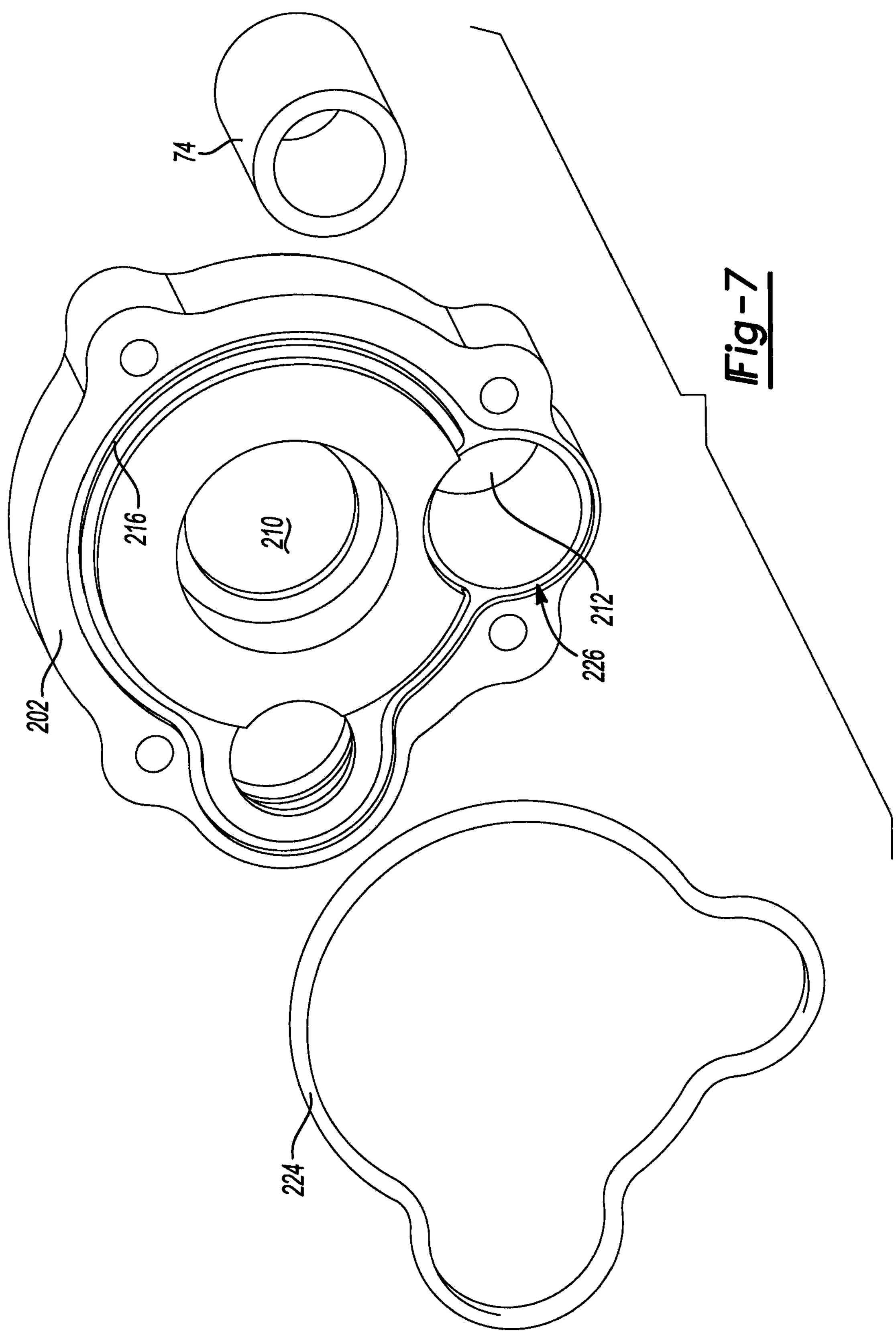
FIG. 7 is an exploded perspective view of the portion of the gear case illustrated in FIG. 5.

The motor 18 can provide rotary power to the transmission 20, which can output rotary power to the output spindle 22. With reference to FIGS. 3 and 4, the transmission 20 includes a plurality of gears, including a driven gear 56 and an output gear 58. The driven gear 56 can be mounted on an axle 60 that can be supported on bearings 62 that are received in the gear case 36 in integrally formed (and if necessary, machined) bearing pockets (not specifically shown). The output gear 58 can be coupled to the output spindle 22 and can likewise be supported relative to the gear case 36 on suitable bearings, such as a ball bearing 66 and a needle bearing 68, that can also be received in a nose 70 (e.g., the apex) of the gear case 36 in integrally formed (and if necessary, machined) bearing pockets (such as identified at reference numeral 210, FIG. 5). It will be appreciated by those of ordinary skill in the art that a first gear (not shown) can be coupled to an output shaft (not shown) of the motor 18 (FIG. 1) and can be meshingly engaged to another gear (not shown) in the transmission 20, and that rotary power can be transmitted through one or more of the gears in the transmission 20 to the driven gear 56. In the particular example provided, the output spindle 22 is integrally formed with the output gear 58 and includes an internally threaded hole 76 that is configured to receive a threaded fastener 78 (FIG. 3) that can be employed to clamp a circular saw blade 80 (FIG. 2) to the output spindle 22.

As the output gear 58 is relatively small in diameter (for example relative to the driven gear 56) and is coupled to the output spindle 22, it will rotate slower and with more torque than the driven gear 56. In one example, the output gear 58 can define an outer diameter D1. The needle bearing 68 can define an inner race 72 having an inner diameter D2 (for engaging an outer diameter of the output spindle 22) and an outer race 74 (FIG. 5) having an outer diameter D3 (for engaging the housing assembly 12). In one example, D1 can be smaller than D2.

The shoe 16 can be generally conventional in its construction and operation and as such, need not be described herein in significant detail. Briefly, the shoe 16 can be pivotably coupled to the housing assembly 12 for rotation about an axis that can be generally parallel to the rotational axis of the circular saw blade 80 (FIG. 2), i.e., to adjust the depth of cut, and about another axis that can be perpendicular to the rotational axis of the circular saw blade 80 (FIG. 2), i.e., to adjust the bevel of the cut. In the example shown, the shoe 16 can pivot about a pivot axis 82 (FIG. 1). The shoe 16 can also pivot about an axis 84 (FIG. 2) for providing a bevel cut. The shoe 16 can include a plate member 100 that can include a blade aperture 102 in which the circular saw blade 80 (FIG. 2) is disposed. The side of the plate member 100 closest to the housing assembly 12 can include a nose aperture 104 into which the nose 70 of the gear case 36 can be disposed. The nose aperture 104 can permit the exterior of the nose 70 of the gear case 36 to be positioned somewhat closer to a flat, working surface 106 (FIG. 2) of the shoe 16 to thereby increase the depth of cut of the circular saw 10. In one example, a portion of the exterior of the nose 70 can be at least partially received by the nose aperture 104. Such a configuration can facilitate the nose 70 attaining a position close to the working surface 106.

With reference to FIGS. 2 and 5 through 7, the gear case 36 can include a first case member 200 (FIG. 2) and a second case member 202 that can be removably coupled to the first case member 200 to close an open end of the first case member 200. The second case member 202 can include an axle recess 210, which is configured to receive the bearing 68 (FIG. 4) and the axle 60 (FIG. 4) that support the driven gear 56 (FIG. 4), and a bearing aperture 212 into which the outer race 74 of the needle bearing 68 (FIG. 4) can be received. A seal groove 216 can be formed on a seal surface 218 of the second case member 202. Generally, the seal groove 216 can include first and second side walls 220 and 222 between which a suitable seal 224 can be received. To facilitate an increased depth of cut, however, a portion 226 of the seal groove 216 that extends about the bearing aperture 212 is configured without an inner wall (i.e., the second side wall 222). When the needle bearing 68 (FIG. 4) is assembled to the second case member 202, the outer race 74 of the needle bearing 68 is positioned to form a wall 230 (i.e., a wall that simulates the second side wall 222) that can cooperate with the first side wall 220 of the seal groove 216 to capture the seal 224. The seal 224 therefore, can directly engage the outer race 74. In such an arrangement, a material thickness of the second case member 202 between the seal 224 and the outer race 74 can be eliminated. By eliminating material (of the second case member 202) in an area outboard of the output spindle 22 in the area 232 (FIG. 6) close to a work piece, the output spindle 22, and therefore, the circular saw blade 80 is effectively moved closer to the work piece increasing the depth of cut.

Figure 8:
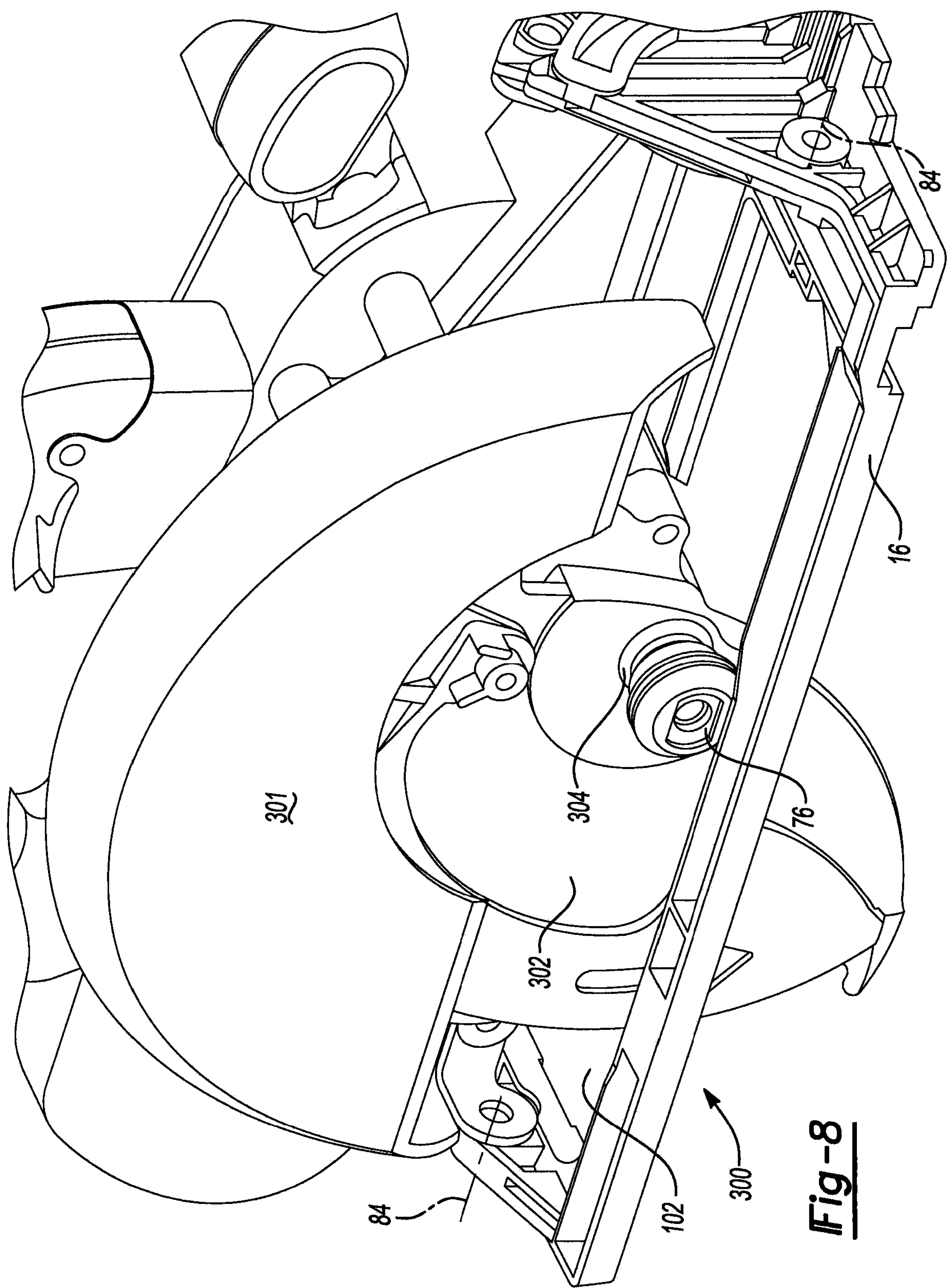
FIG. 8 is a perspective view of a portion of the circular saw having a blade guard assembly constructed in accordance with the teachings of the present disclosure.
Figure 9:
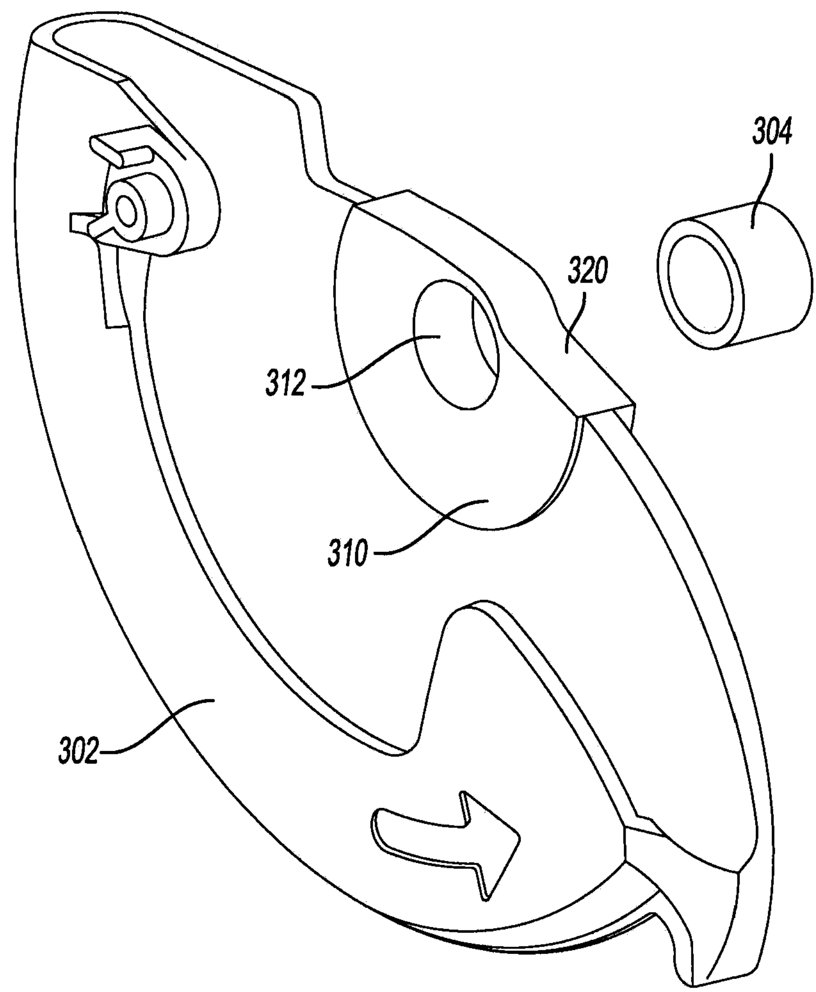
FIG. 9 is an exploded perspective view of a portion of the blade guard assembly of FIG. 8.

It will be appreciated that the above-described circular saw 10 can employ a blade guard assembly that can shroud the circular saw blade. A first blade guard assembly constructed in accordance with the teachings of the present disclosure is illustrated in FIGS. 8 and 9 and generally indicated by reference numeral 300. The blade guard assembly 300 can include an upper blade guard 301 and a lower guard member 302 and a needle bearing 304. The lower guard member 302 can have a relatively low-profile bearing hub 310 with a bearing aperture 312 into which the needle bearing 304 may be press-fit or otherwise attached. The needle bearing 304 (with the lower guard member 302) can be received over the output spindle 22. An edge 320 of the bearing hub 310 that would be rotated proximate the plate member 100 when both the shoe 16 is set to achieve a maximum depth of cut and the lower guard member 302 is rotated into a fully open condition can extend from the outer periphery of the needle bearing 304 (i.e., from the outer circumference of the outer bearing race of the needle bearing 304) by a relatively small amount, such as between about 0.2 inch and 0.4 inch. Moreover, the edge 320 need not be entirely concentric with the bearing aperture 312 over a relatively large circular segment but rather can be contoured in view of its position in the fully open condition to maintain a sufficient degree of strength and robustness.

Figure 10:
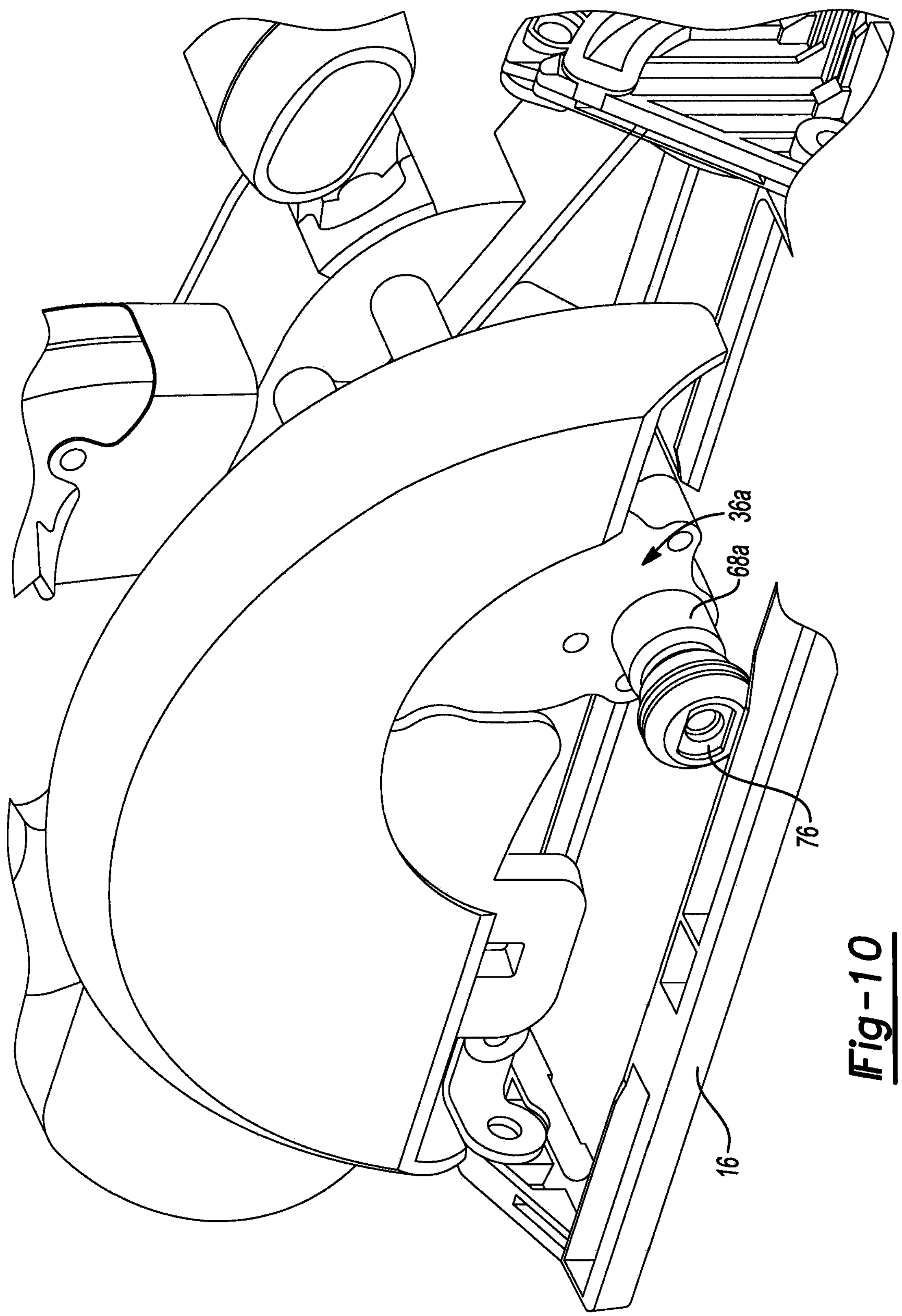
FIG. 10 is a perspective view of an alternately constructed circular saw.

A similar blade guard assembly **300*a* is illustrated in FIG. 10. In this example, the needle bearing 68*a* that is employed to support the output spindle 22 is relatively longer than the needle bearing 68 that is illustrated in FIG. 4. The lower blade guard 302 (FIG. 9) can be pivotally mounted to a first portion of the outer bearing race of the needle bearing 68*a*, while a remaining portion of the outer bearing race can be press-fit to the gear case 36*a***.

Figure 11:
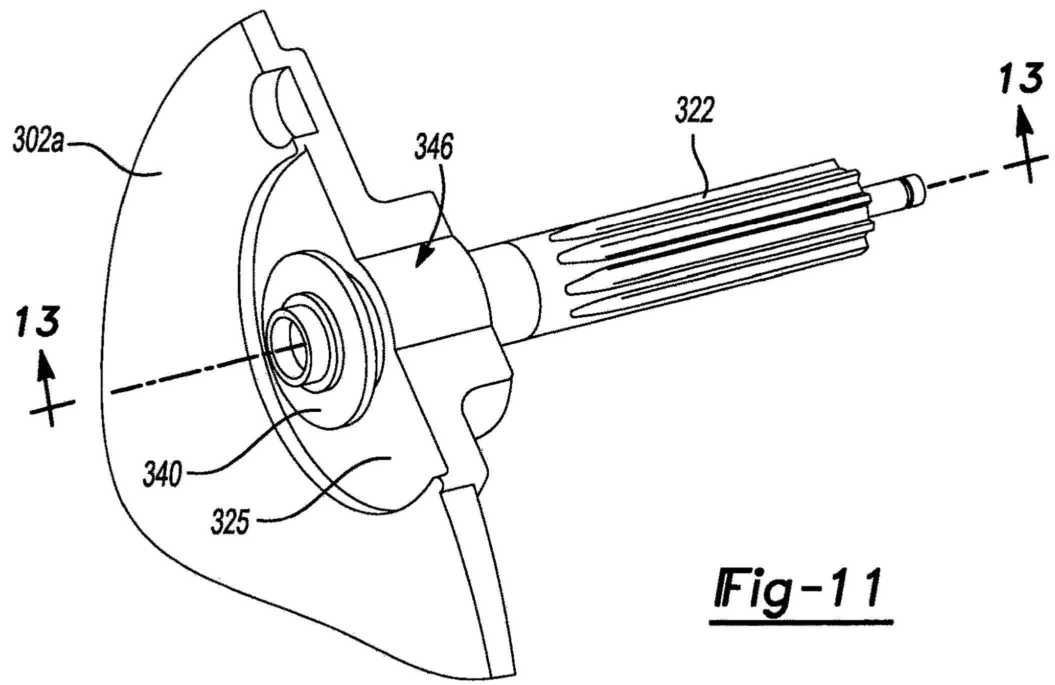
FIG. 11 is a perspective view of a lower guard rotatably disposed about an output spindle according to additional features.

With reference now to FIG. 11, another lower blade guard **302*a* is shown operatively associated with an output spindle 322. The lower blade guard 302*a* defines a guard body hub 325 for receiving a portion of the output spindle 322. With additional reference now to FIGS. 12 and 13, the hub 325 defines an outer annular pocket 326 and an inner annular pocket 328. The outer annular pocket 326 is configured to securably receive an outer bearing 330 while the inner annular pocket 328 is configured to securably receive an inner bearing 332. The outer bearing 330 and the inner bearing 332** can define any suitable bearing or bearing assembly, such as, by not limited to, a ball bearing.

Figure 12:
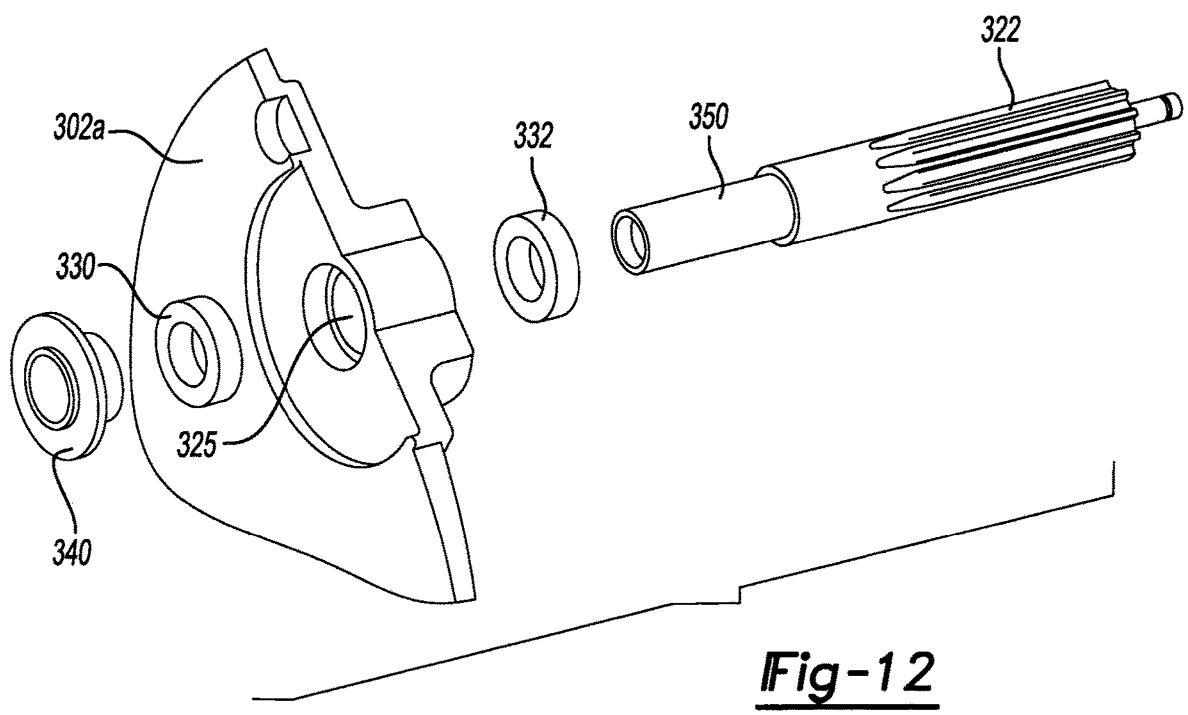
FIG. 12 is an exploded perspective view of the lower blade guard and output spindle of FIG. 11 and shown operatively associated with a pair of bearings and a clamp washer.
Figure 13:
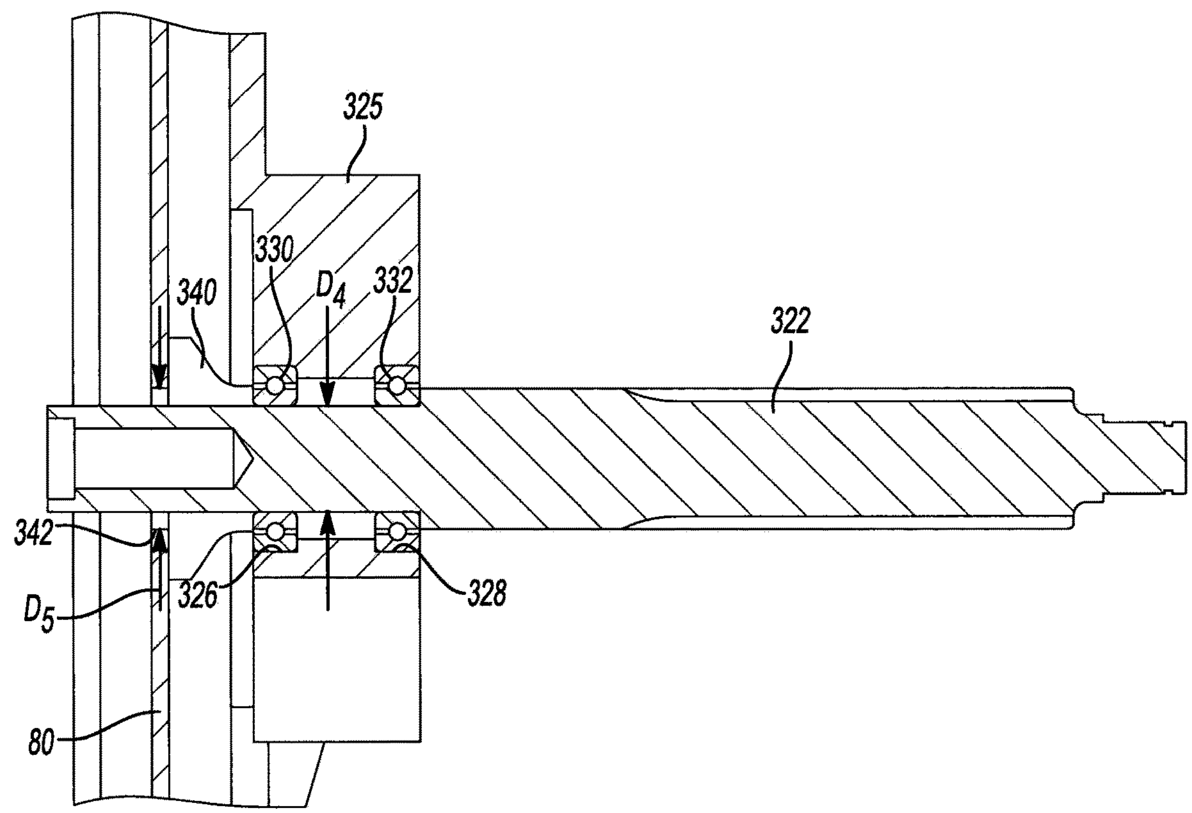
FIG. 13 is a cross-sectional view taken along line 13-13 of FIG. 11.

An inner clamp washer 340 can be disposed intermediate of the outer bearing 330 and the saw blade 80. The inner clamp washer 340 can define a shoulder 342 for operatively receiving and providing a support surface for the central aperture for the saw blade 80. As best illustrated in FIGS. 11 and 12, the hub 325 of the lower blade guard **302*a* can define a thin wall section 346. The thin wall section 346 allows the spindle 322 to locate closer to a work piece therefore locating the blade 80 (FIG. 13) closer to the work piece to penetrate deeper into the work piece during cutting. The inner clamp washer 340 is press-fit onto an outboard portion 350 of the spindle 322. The outboard portion 350 where the outer bearing 330 and inner bearing 332 mount defines a diameter D4 (FIG. 13). A diameter D5 is defined at the shoulder 342 of the inner clamp washer 340. The diameter D4 is less than the diameter D5. The shoulder 342, having the increased diameter D5, facilitates proper centering of the saw blade 80. In this way, the diameter D5 can also substantially correspond to a diameter of a central aperture 354 of the circular saw blade 80**.

Figure 14:
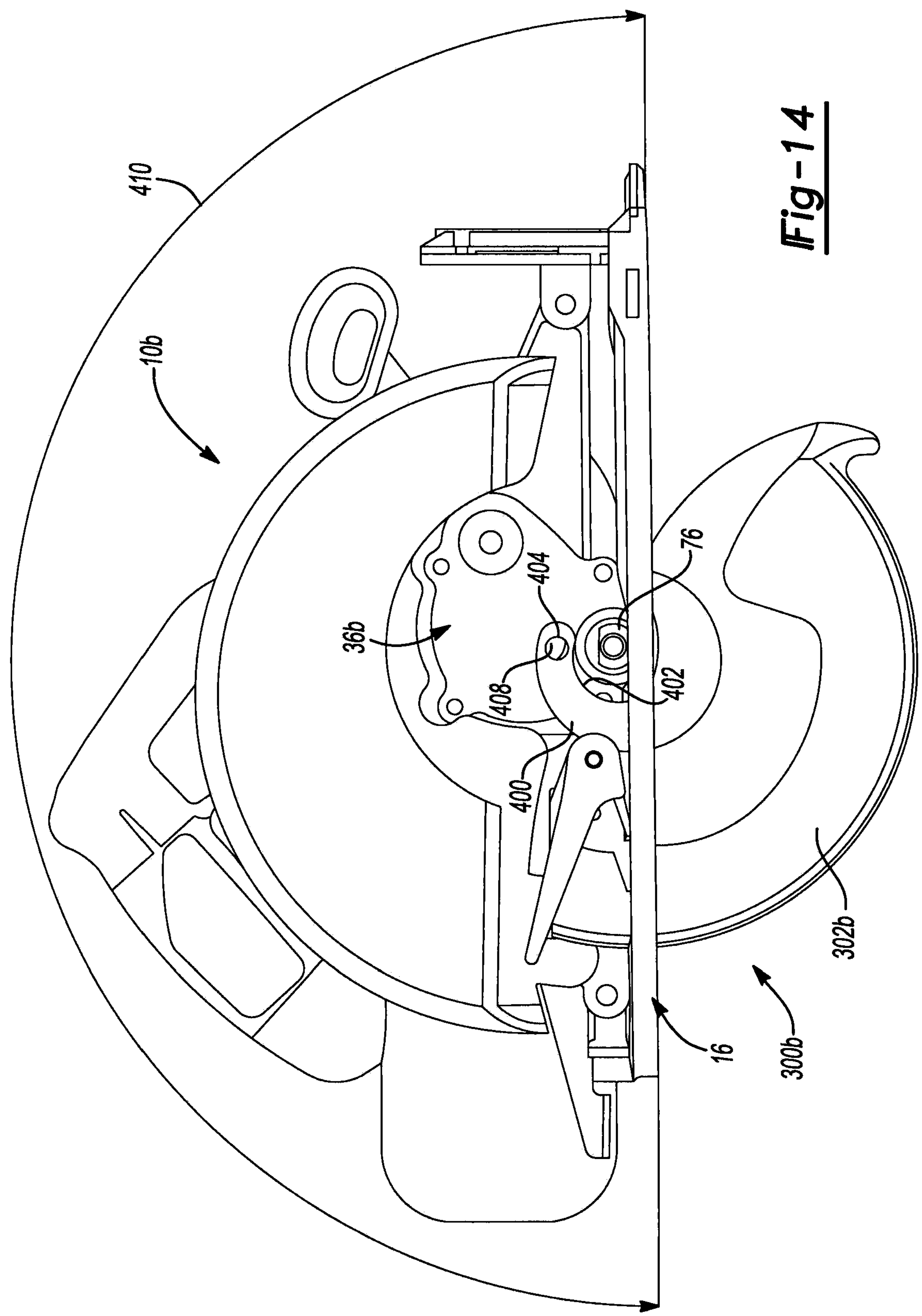
FIG. 14 is a side elevation view of a circular saw having another blade guard assembly constructed in accordance with the teachings of the present disclosure.
Figure 15:
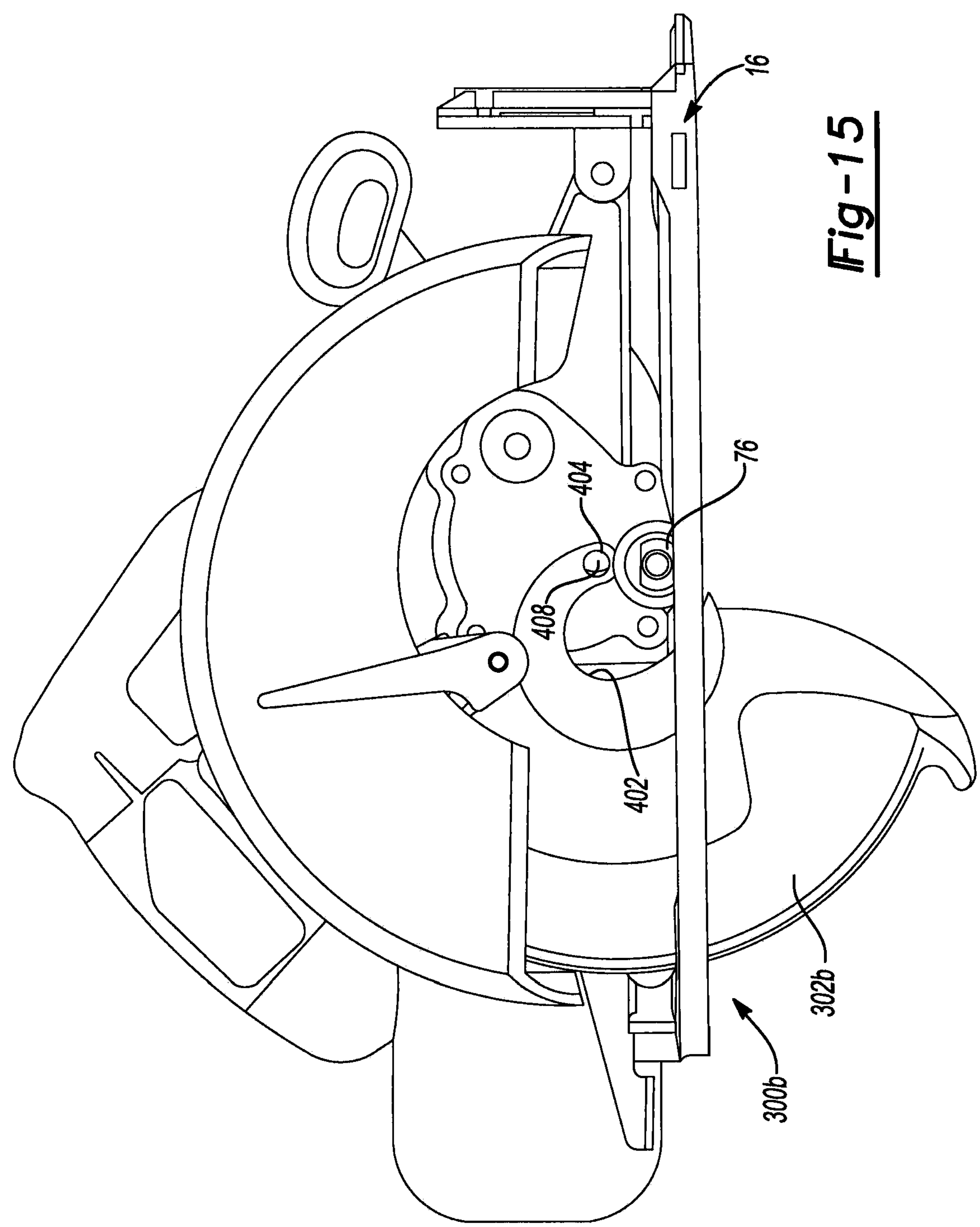
FIGS. 15 and 16 are side elevation views similar to that of FIG. 14 but illustrating the lower guard member in an intermediate and a fully open position, respectively.
Figure 16:
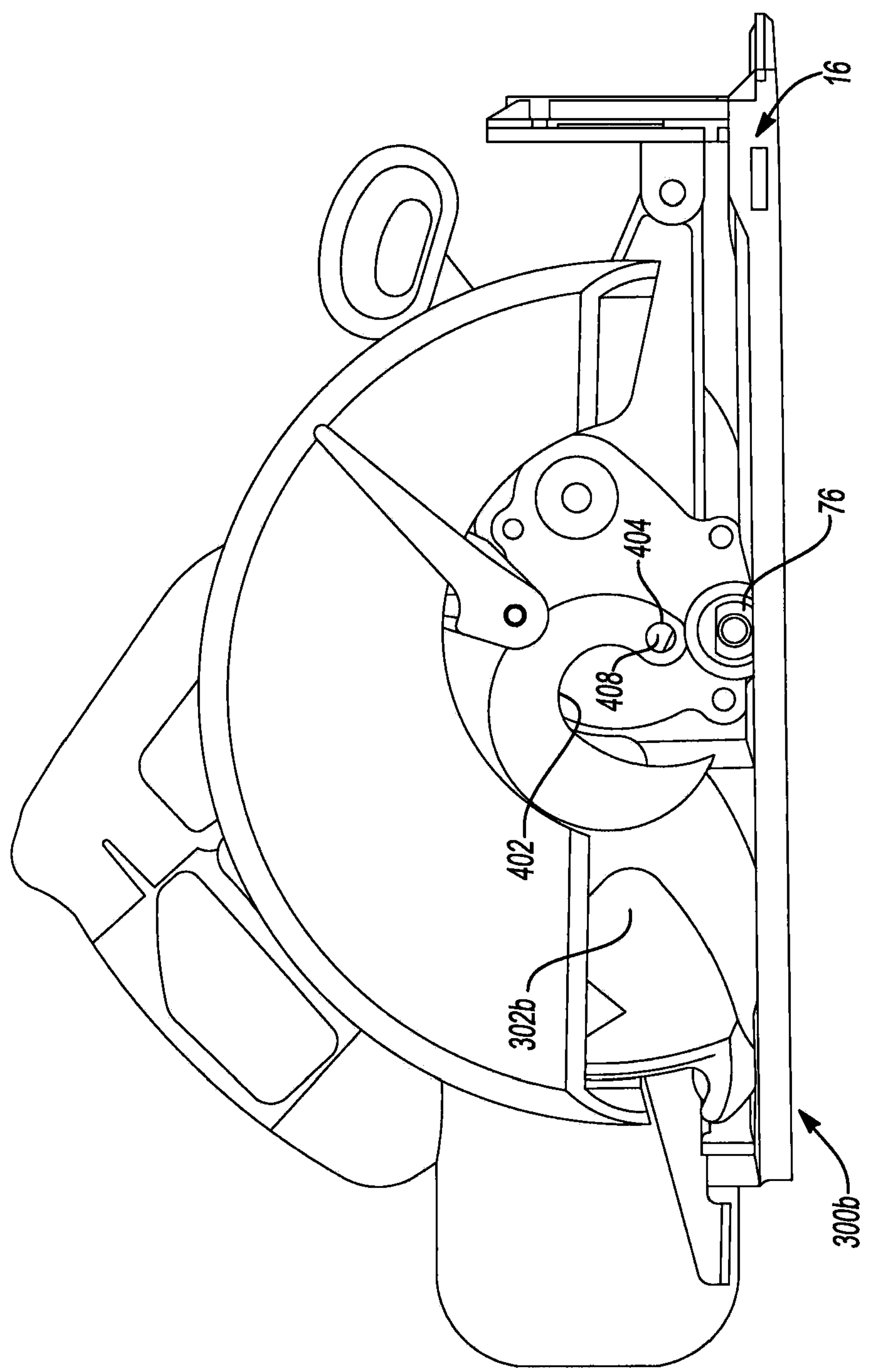

Another blade guard assembly **300*b* is illustrated in FIGS. 14 through 16. It will be appreciated that except as noted herein, a remainder of the circular saw 10*b* can be generally similar to the circular saw 10 described above and illustrated in FIGS. 1 through 4 (or any other circular saw described herein). In this example, the lower guard member 302*b* is pivotally mounted to the gear case 36*b* at a point that is generally vertically in-line and above the output spindle 22 when the shoe 16 is adjusted to a maximum depth of cut. The lower guard member 302*b* can include a mount 400 that can define a spindle slot 402 and a pivot aperture 404. The output spindle 22 can be received through the spindle slot 402, while a pin 408, which can be fixedly coupled to the gear case 36*b*, can be received through the pivot aperture 404. The pin 408 can be a conventional dowel pin, a rivet or could be a cylindrical portion of a fastener, such as a socket-head cap screw or shoulder screw. FIG. 14 illustrates the lower guard member 302*b* in a fully closed condition; FIG. 15 illustrates the lower guard member 302*b* in a partially open condition; and FIG. 16 illustrates the lower guard member 302*b* in a fully open condition in which no portion of the lower guard member 302*b* is disposed directly under the output spindle 22. As illustrated in FIG. 14, a 180 degree area 410 above the shoe 16 is able to fully accommodate the lower guard 302*b* (in the fully open position of FIG. 16**).

Figure 17:
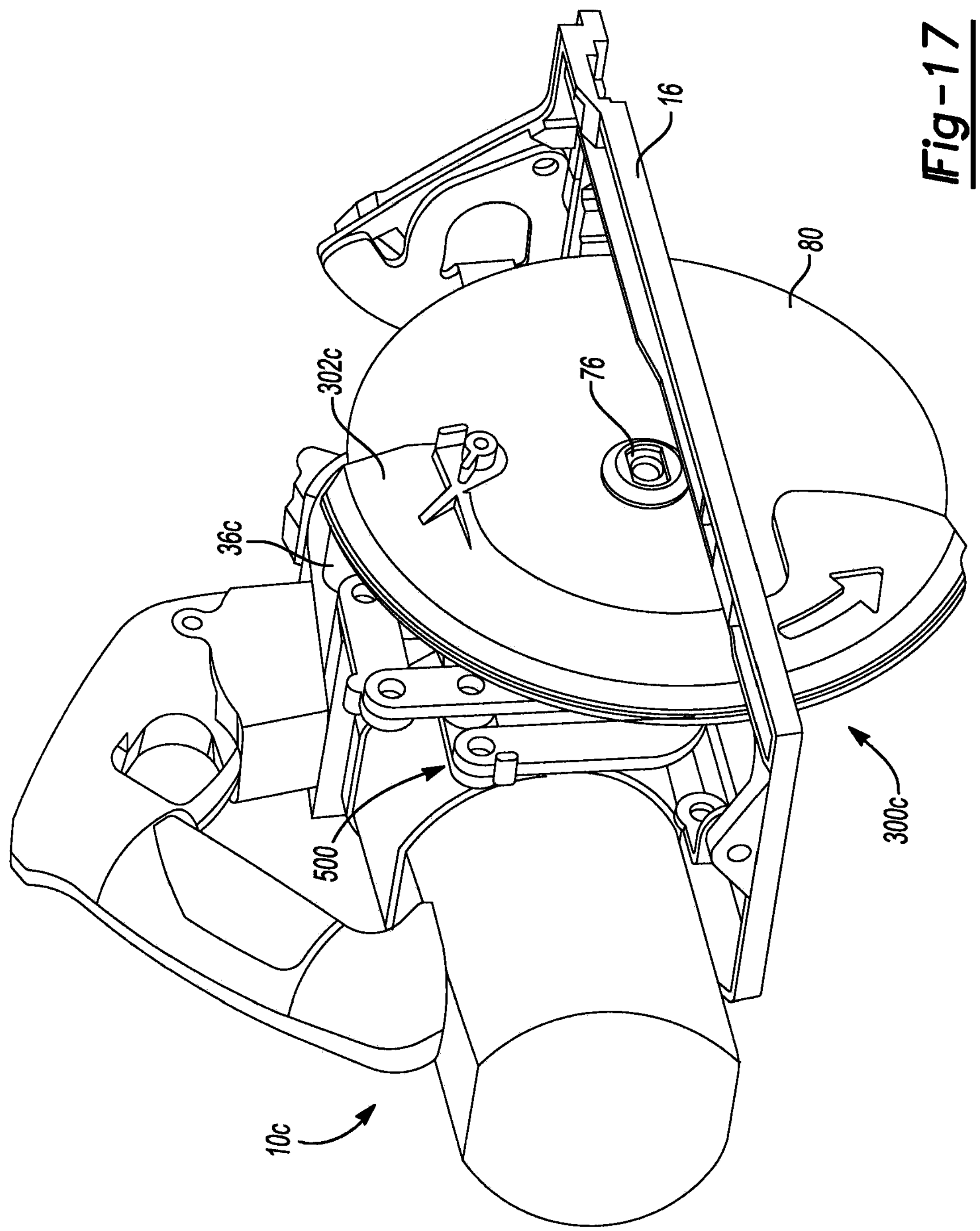
FIGS. 17 and 18 are perspective views of a circular saw having another blade guard assembly constructed in accordance with the teachings of the present disclosure.
Figure 18:
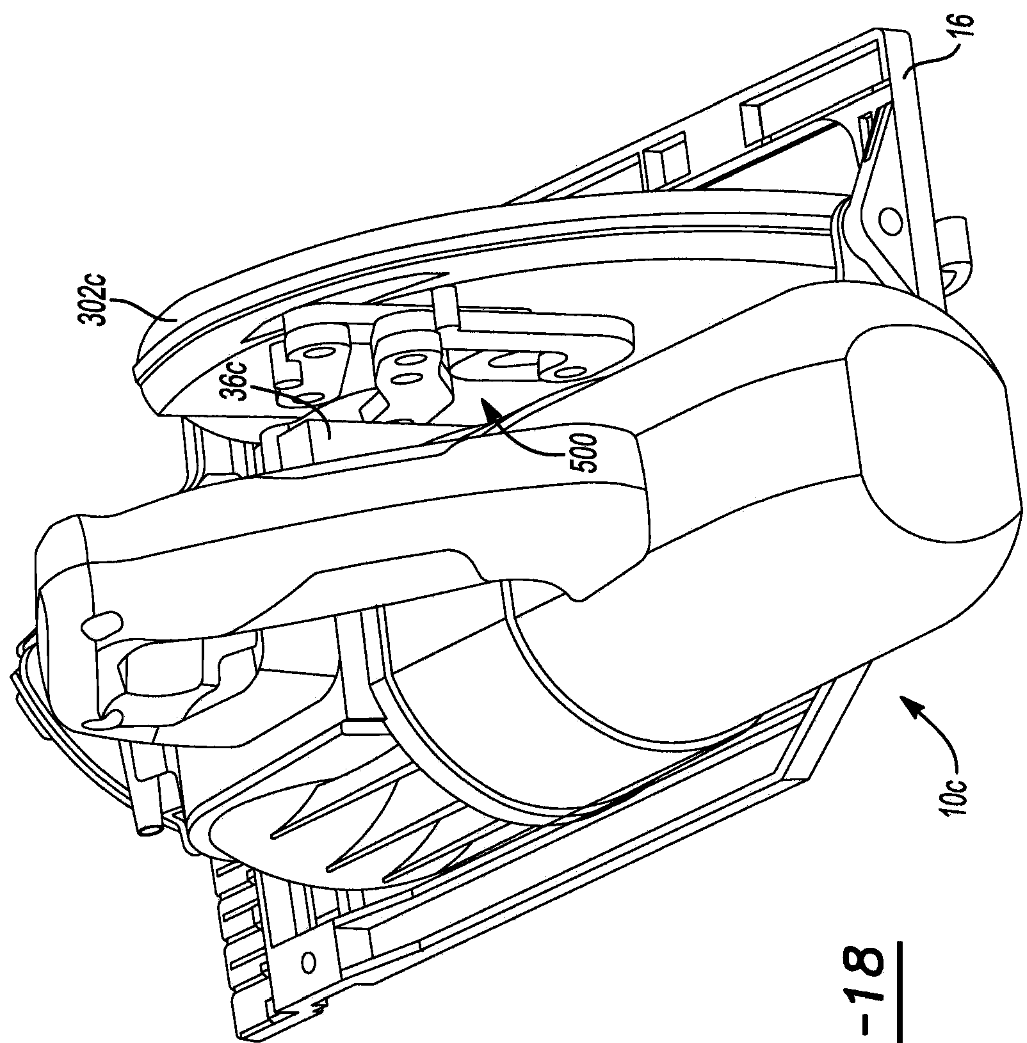
Figure 19:
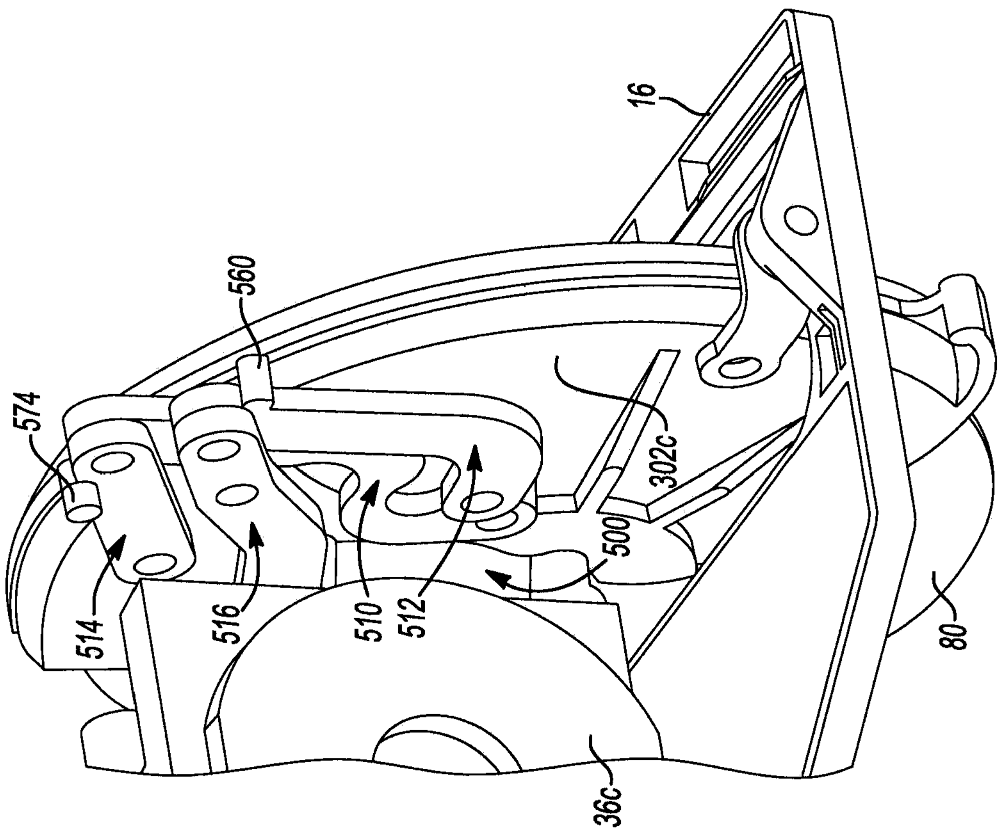
FIG. 19 is a perspective view of a portion of the circular saw of FIGS. 17 and 18.

Yet another blade guard assembly **300*c* is illustrated in FIGS. 17 through 19. It will be appreciated that except as noted herein, a remainder of the circular saw 10*c* can be generally similar to the circular saw 10 described above and illustrated in FIGS. 1 through 4 (or any other circular saw described herein). In this example, a linkage 500 is employed to pivotally couple the lower guard member 302*c* to the gear case 36*c*. With additional reference to FIGS. 20 through 22, the linkage 500 can include a first or Z-shaped link 510, a second or L-shaped link 512, a third or I-shaped link 514 and a fourth link 516. The first link 510 can include a first arm 520, a second arm 522 that can be coupled to a distal end of the first arm 520, and a third arm 524 that can be coupled to an opposite end of the second arm 522 and which can extend generally perpendicular thereto. The first arm 520 can be oriented to provide a space 526 into which an end of the second arm 522 can be received when the lower guard member 302***b* is rotated into the fully open position.

A first pivot aperture 540 can be formed in the proximal end of the first arm 520, a second pivot aperture 542 can be formed in a central portion of the third arm 524 (i.e., at a point between the opposite ends of the third arm 524) and a third pivot aperture 544 can be formed in a distal end of the third arm 524. A first pivot pin (not shown), which can comprise a pin, a rivet or a cylindrical portion of a fastener, such as a socket-head cap screw, can be received through the first pivot aperture 540 and coupled to the lower guard member 302*c* to pivotably couple the first link 510 to the lower guard member 302*c*. The second link 512 can include a fourth arm 550 and a fifth arm 552. A fourth pivot aperture 556 can be formed in the proximal end of the fourth arm 550. The fifth arm 552 can be coupled to a distal end of the fourth arm 550 and extend generally perpendicular therefrom. A fifth pivot aperture 558 can be formed in the distal end of the fifth arm 552 and a first stop member 560 that can be coupled to a distal end of the fifth arm 552. A second pivot pin (not shown), which can comprise a pin, a rivet or a cylindrical portion of a fastener, such as a socket-head cap screw, can be received through the fourth pivot aperture 556 and coupled to the lower guard member 302*c* to pivotably couple the second link 512 to the lower guard member 302*c*.

The third link 514 can include a sixth pivot aperture 570, which can be formed through its proximal end, a seventh pivot aperture 572, which can be formed through its distal end, and a second stop member 574. A third pivot pin (not shown), which can comprise a pin, a rivet or a cylindrical portion of a fastener, such as a socket-head cap screw, can be received through the fifth pivot aperture 558 and the sixth pivot aperture 570 to pivotably couple the second and third links 512 and 514 to one another. A fourth pivot pin (not shown), which can comprise a pin, a rivet or a cylindrical portion of a fastener, such as a socket-head cap screw, can be received through the seventh pivot aperture 572 and coupled to the gear case 36*c* (FIG. 17) to pivotably couple the third link 514 to the gear case 36*c* (FIG. 17). The fourth link 516 can include an eighth pivot aperture 580, which can be formed through its proximal end, a ninth pivot aperture 582, which can be formed through the fourth link 516 at a location proximate the eighth pivot aperture 580, and a tenth pivot aperture 584 that can be formed through a distal end of the fourth link 516. A fifth pivot pin (not shown), which can comprise a pin, a rivet or a cylindrical portion of a fastener, such as a socket-head cap screw, can be received through the fourth pivot aperture 556 and the eighth pivot aperture 580 to pivotably couple the second and fourth links 512 and 516 to one another. A sixth pivot pin (not shown), which can comprise a pin, a rivet or a cylindrical portion of a fastener, such as a socket-head cap screw, can be received through the second pivot aperture 542 and the ninth pivot aperture 582 to pivotably couple the first and fourth links 510 and 516 to one another. A seventh pivot pin (not shown), which can comprise a pin, a rivet or a cylindrical portion of a fastener, such as a socket-head cap screw, can be received through the tenth pivot aperture 584 and coupled to the gear case 36*c* (FIG. 17) to pivotably couple the fourth link 516 to the gear case 36*c* (FIG. 17).

Figure 20:
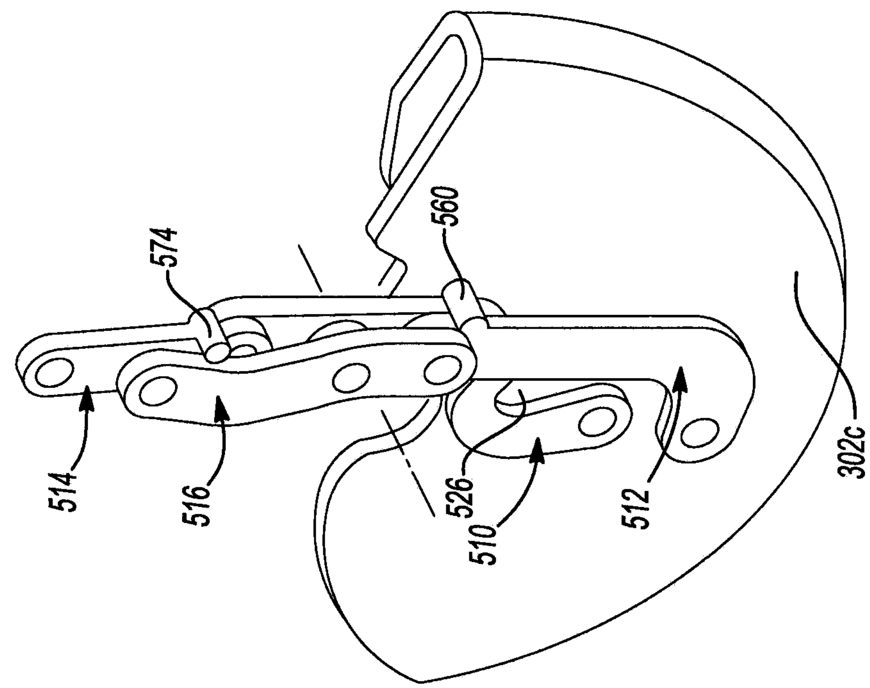
FIG. 20 is a perspective view of the blade guard assembly illustrated in FIGS. 17 through 19.
Figure 22:
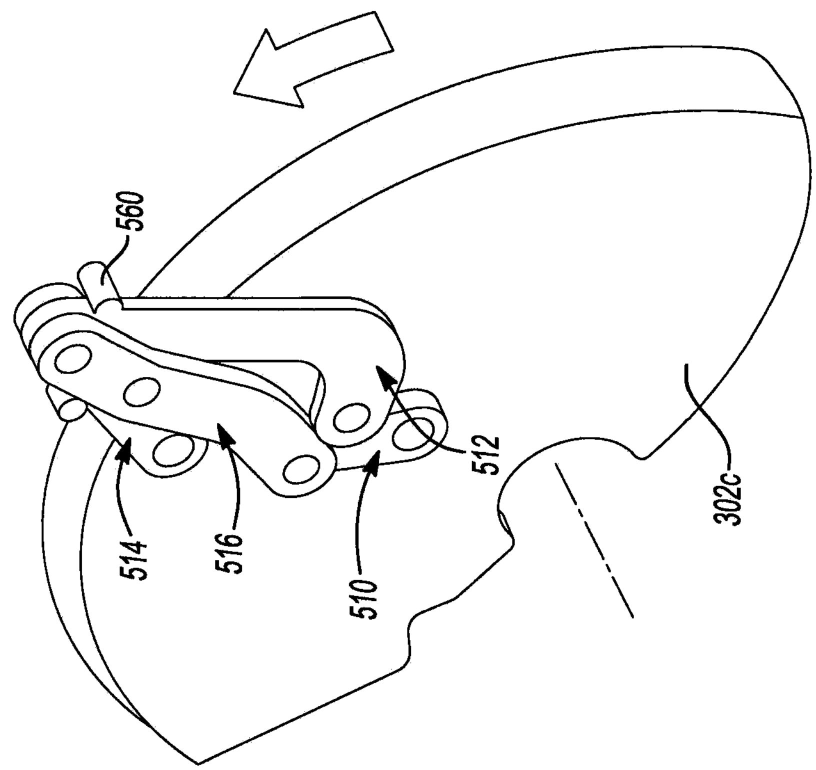
FIGS. 21 and 22 are perspective views similar to that of FIG. 20 but illustrating the lower guard member in an intermediate and a fully open position, respectively.
Figure 21:
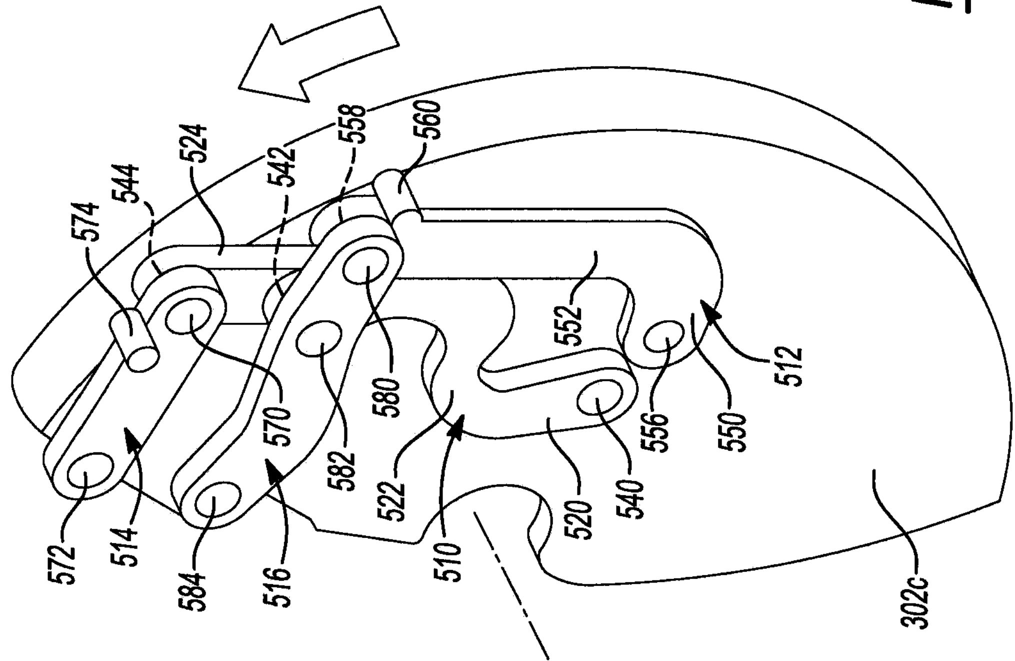

In the example provided, the lower guard member 302*c* can be pivoted into a closed position in which its arcuate outer edge is disposed beneath the output spindle 22. As the lower guard member 302*c* is rotated to its fully open position as depicted in FIGS. 20 through 22, the linkage 500 facilitates rotation of the lower guard member 302*c* concentric or nearly concentric, to the output spindle 22 (FIG. 17). The first stop member 560 can contact the fourth link 516 and the second stop member 574 can contact the fourth link 516 when the lower guard member 302*c* is located in the fully closed position to inhibit further rotation of the lower guard member 302*c* relative to the housing assembly 12 in a closing direction.

Figure 23:
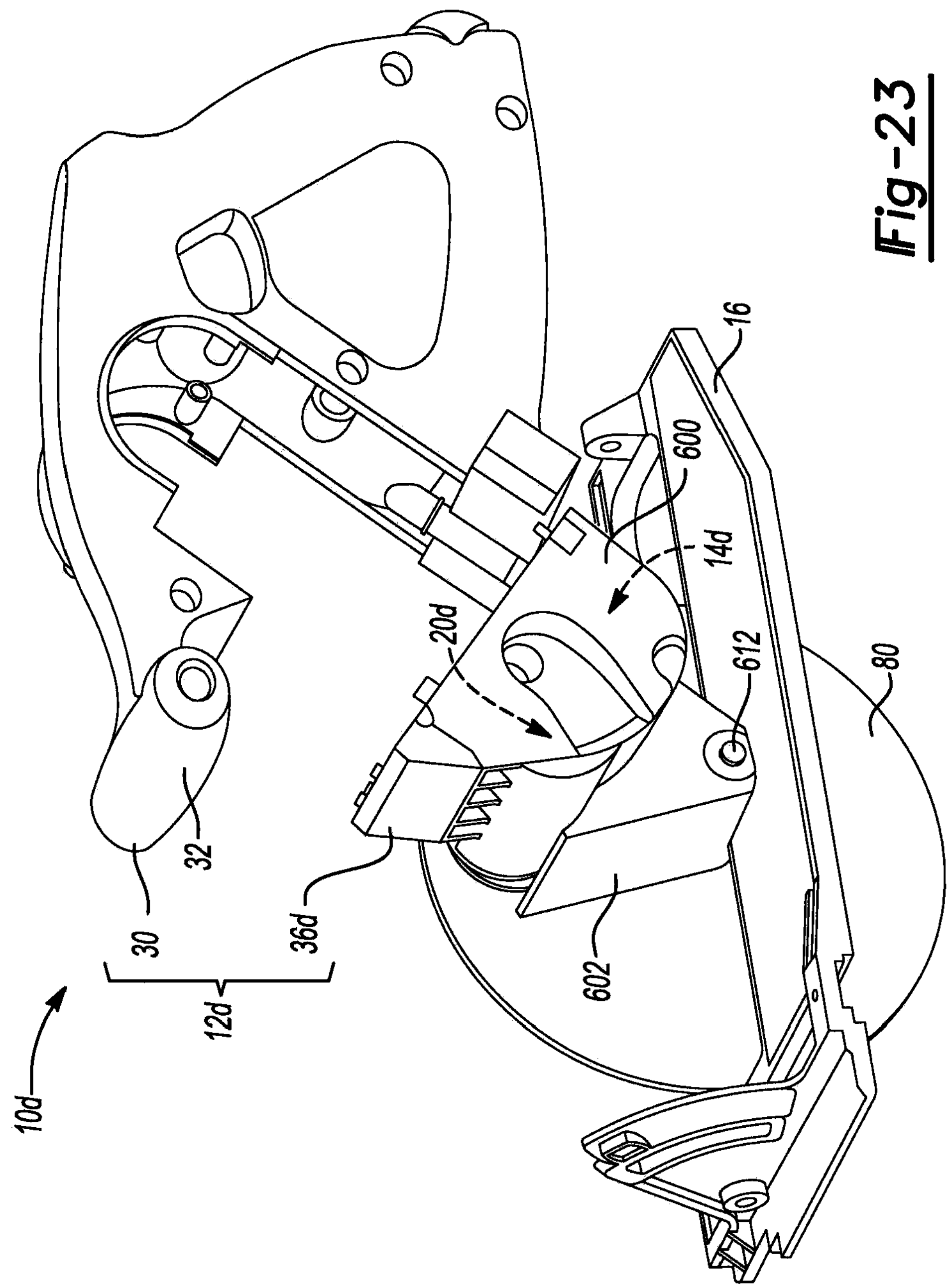
FIG. 23 is a perspective view of another circular saw constructed in accordance with the teachings of the present disclosure.
Figure 24:
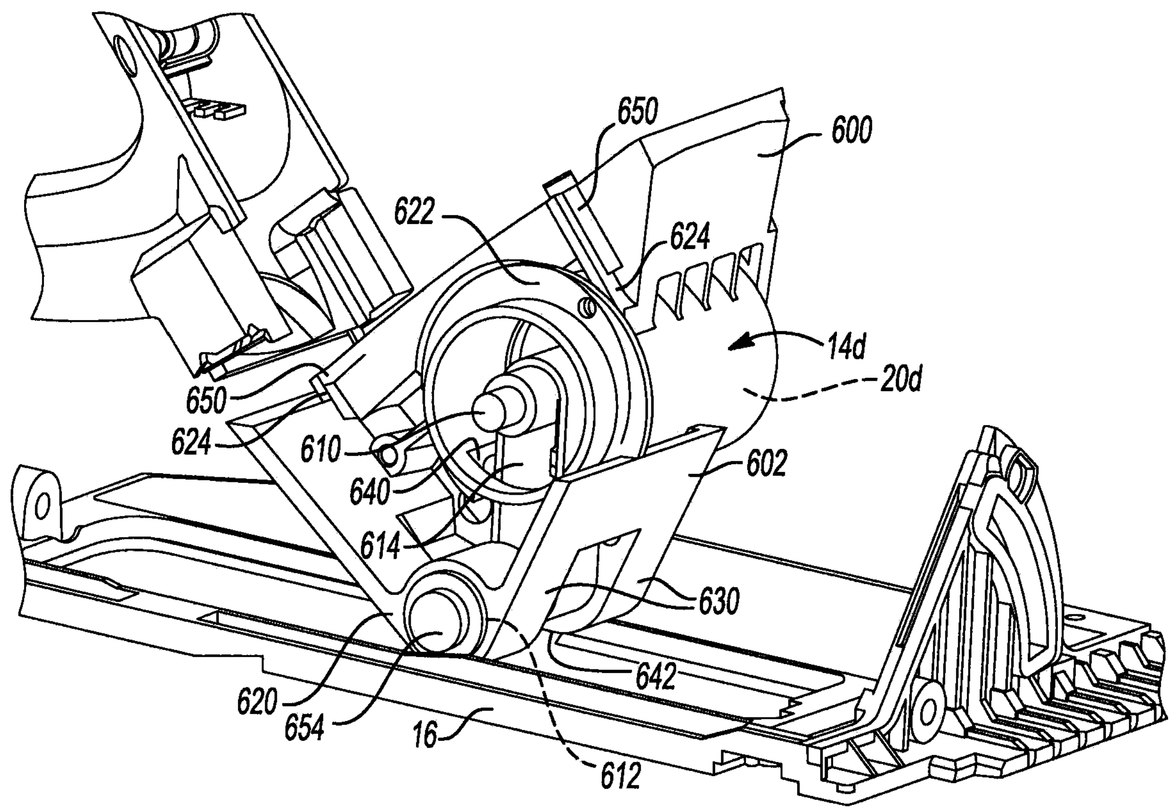
FIG. 24 is an enlarged perspective view of a portion of the circular saw of FIG. 23, illustrating the gear case in more detail.
Figure 25:
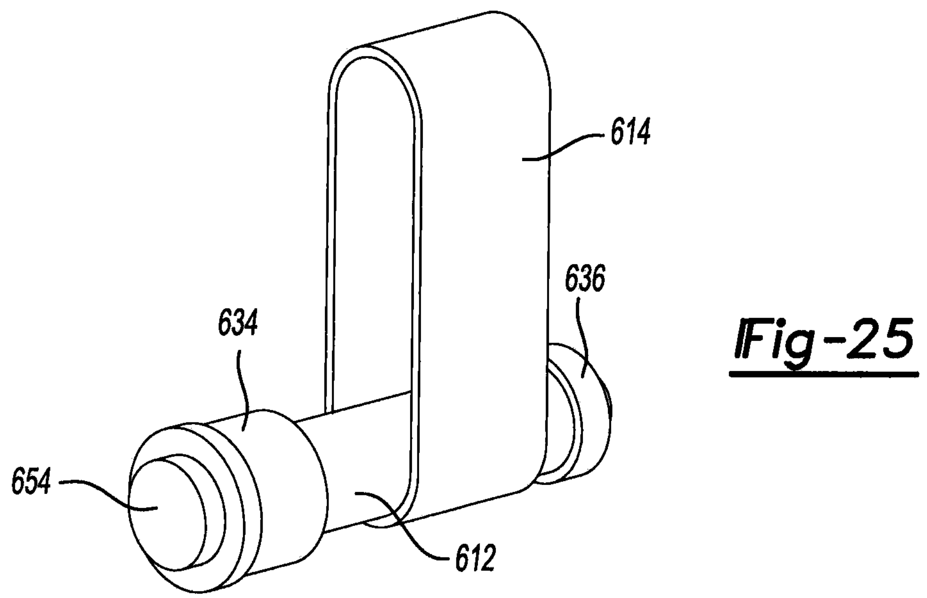
FIG. 25 is a perspective view of a portion of the circular saw of FIG. 23 illustrating the belt and the output spindle in more detail.

With reference to FIGS. 23 through 25, a portion of another circular saw constructed in accordance with the teachings of the present disclosure is generally indicated at reference number 10*d*. Except as noted herein, the circular saw 10*d* can be constructed in a manner that is generally similar to that of the circular saw 10 of FIGS. 1 through 3 (or any other circular saw described herein). The circular saw 10*d* can include a housing assembly 12*d*, a drive motor assembly 14*d* and a shoe 16. The housing assembly 12*d* can include first and second shell members 30 and 32, and a gear case 36*d* that can include a first case member 600 and a second case member 602.

The drive motor assembly 14*d* can include a motor (not shown), a transmission 20*d*, an intermediate spindle 610, an output spindle 612, a belt 614 and a tensioning mechanism (not shown). The motor (such as motor 18, FIG. 1), the transmission 20*d* and the intermediate spindle 610 can be housed in the first case member 600, the output spindle 612 can be housed in the second case member 602 and the tensioning mechanism can adjustably couple the first and second case members 600 and 602 to one another.

The motor (not shown) can provide rotary power to the transmission 20*d*, which can output rotary power to the intermediate spindle 610. In the example provided, the transmission 20*d* includes a plurality of gears, including an output gear (not specifically shown). A pair of bearings (not shown) can be received in the first case member 600 and can rotatably support the output gear. It will be appreciated by those of ordinary skill in the art that a first gear (not shown) can be coupled to an output shaft (not shown) of the motor and can be meshingly engaged to another gear (not shown) in the transmission 20*d*, and that rotary power can be transmitted through one or more of the gears in the transmission to the output gear.

The second case member 602 can be a generally V-shaped structure that can define a spindle mount 620, a belt guard 622 and a plurality of guide legs 624. The spindle mount 620 can define a pair of bearing mounts 630 that can be configured to receive a pair of bearings, such as a needle bearing 634 and a ball bearing 636, that can rotatably support the output spindle 612 in a nose (i.e., the apex) of the second case member 602. The belt guard 622 can be an annular structure that can be disposed about and shroud the intermediate spindle 610 when the first and second case members 600 and 602 are coupled to one another. A first belt aperture 640 can be formed through the belt guard 622 and a second belt aperture 642 can be formed through the nose of the second case member 602 between the bearing mounts 630. The guide legs 624 can project from the remainder of the second case member 602 and can engage corresponding leg receiving structures 650. The guide legs 624 and the leg receiving structures 650 can cooperate to slidably mount the second case member 602 to the first case member 600.

The intermediate spindle 610 can be coupled for rotation with the output gear, extending outwardly therefrom in a cantilevered manner and can be disposed within a recess (not specifically shown) that is formed in the first case member 600.

The output spindle 612 can be mounted on the needle bearing 634 and the ball bearing 636 and can be removably received in the bearing mounts 630. A threaded fastener 654 can be threadably received into a hole (not specifically shown) in an end of the output spindle 612 and can be employed to fixedly but removably couple a circular saw blade to the output spindle 612. In the particular example provided, the needle bearing 634 and the ball bearing 636 are press fit into the second case member 602 and remain in place when the output spindle is removed from the second case member. A suitable retaining means, such as a spring clip (not specifically shown) can be employed to retain the output spindle within ball bearing 636.

The belt 614 can be received over the output spindle 612 between the needle bearing 634 and the ball bearing 636, as well as over the intermediate spindle 610. In one example, the diameter of the intermediate spindle 610 in which the belt 614 rides is substantially equivalent to a diameter of the output spindle 612 in which the belt rides. As can be appreciated, by keeping the diameter of the output spindle relatively small (i.e., such as substantially equivalent to the diameter of the intermediate spindle 610), an increased depth of cut can be realized.

The tensioning mechanism can be employed to move the second case member 602 relative to the first case member 600 to tension the belt 614 by an amount that is sufficient to transmit rotary power (via the belt 614) between the intermediate spindle 610 and the output spindle 612. Any suitable tensioning mechanism may be employed, including spring-loaded (automatic) tensioners. In the particular example provided, a jackscrew (not shown) is employed to move the second case member 602 relative to the first case member 600. The jackscrew can be threadably received into a corresponding threaded bushing (not shown) that can be fixedly coupled to the second case member 602 and can abut a wear plate (not specifically shown) that can be mounted to the first case member 600. The threaded bushing and the wear plate can be formed of a wear resistant material, such as a hardened steel, to provide increased durability.

When the belt 614 is to be installed to the output spindle 612, the tensioning mechanism can be operated to move the second case member 602 such that the output spindle 612 is relatively close to the intermediate spindle 610 and the output spindle 612 can be at least partially withdrawn from the bearing mounts 630 so that the output spindle 612 clears the second belt aperture 642. The belt 614 can be fitted through both the second belt aperture 642 and the first belt aperture 640, and can be fitted over the intermediate spindle 610. The output spindle 612 can be inserted to the bearing mounts 630 such that the belt 614 is disposed between the needle bearing 634 and the ball bearing 636. The tensioning mechanism can be operated to drive the second case member 602 away from the first case member 600. In this regard, the guide legs 624 and the leg receiving structures 650 cooperate to guide the second case member 602 relative to the first case member 600 as the second case member 602 is moved by the tensioning mechanism.

Figure 26:
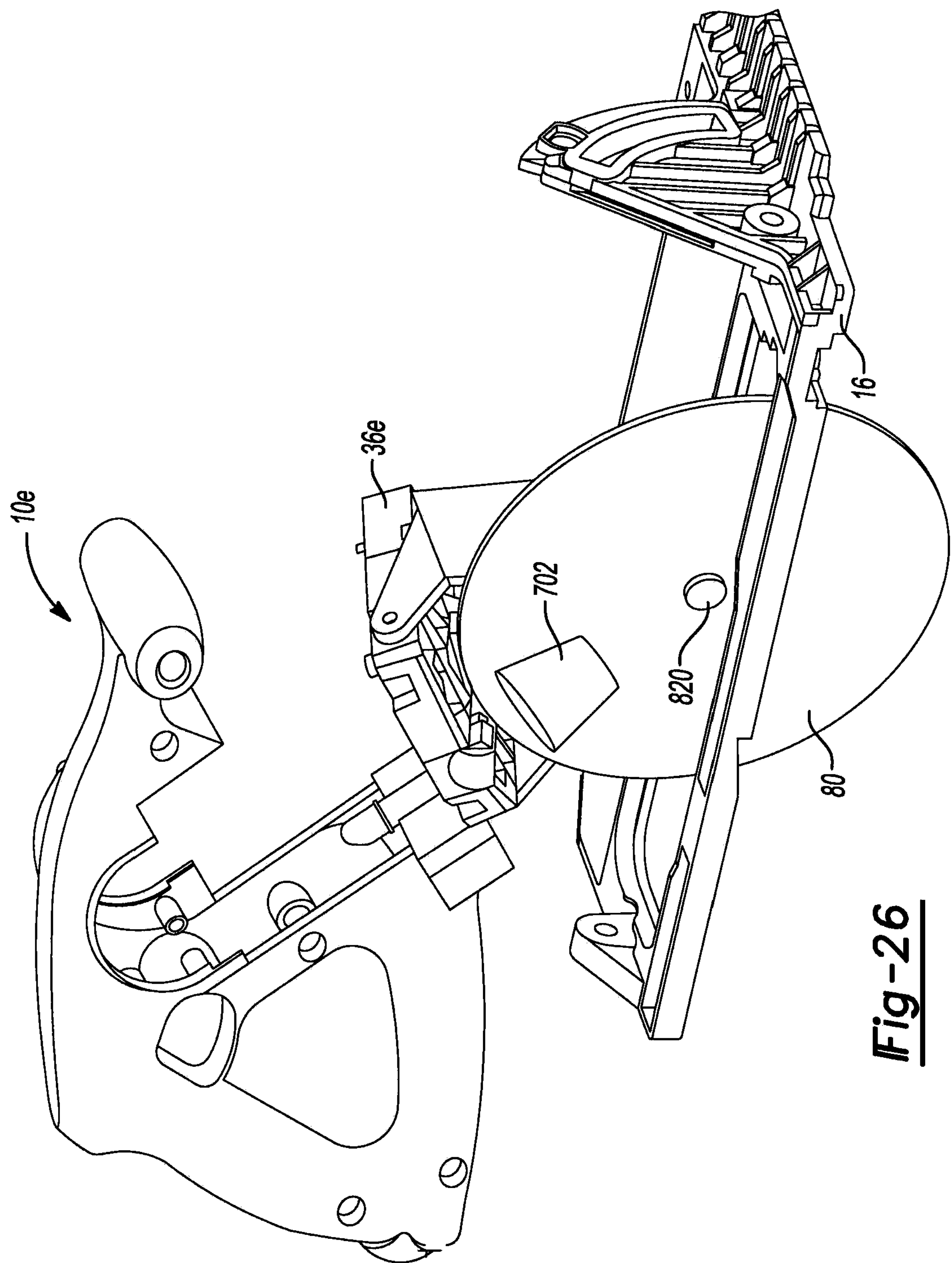
FIGS. 26 through 28 are perspective views of yet another circular saw constructed in accordance with the teachings of the present disclosure.
Figure 27:
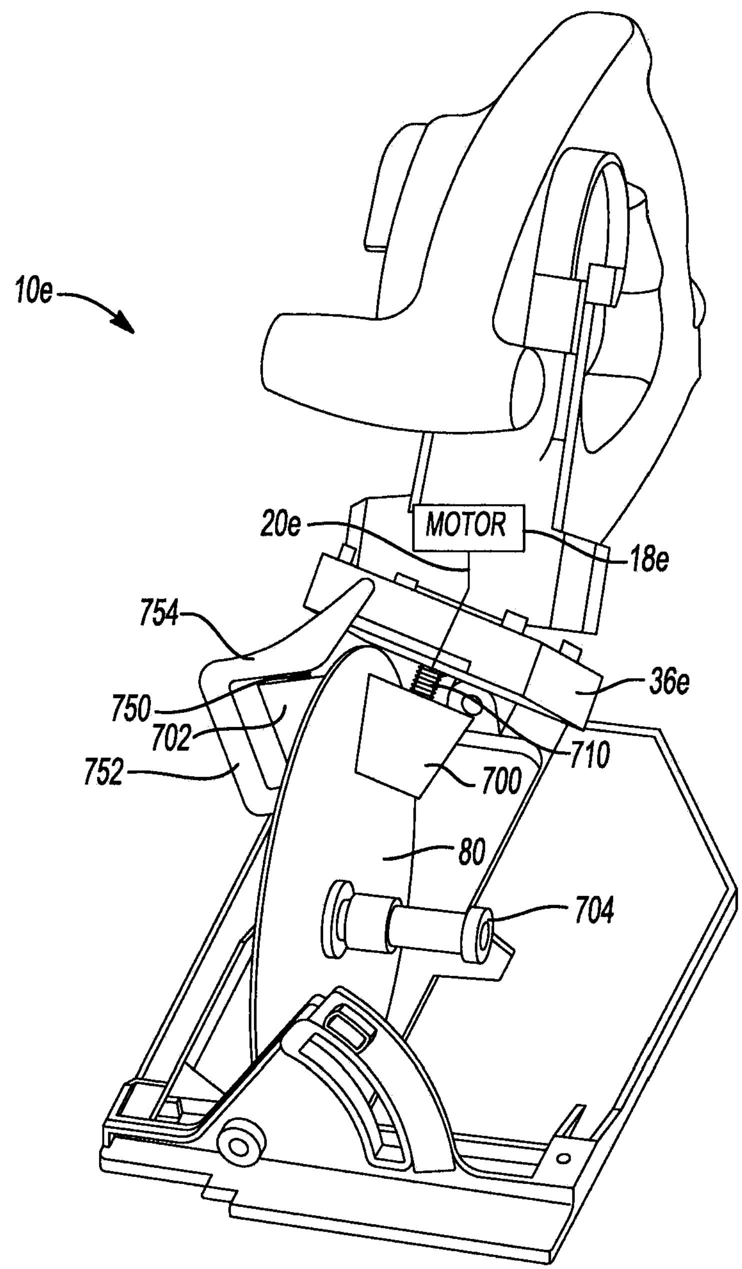
Figure 28:
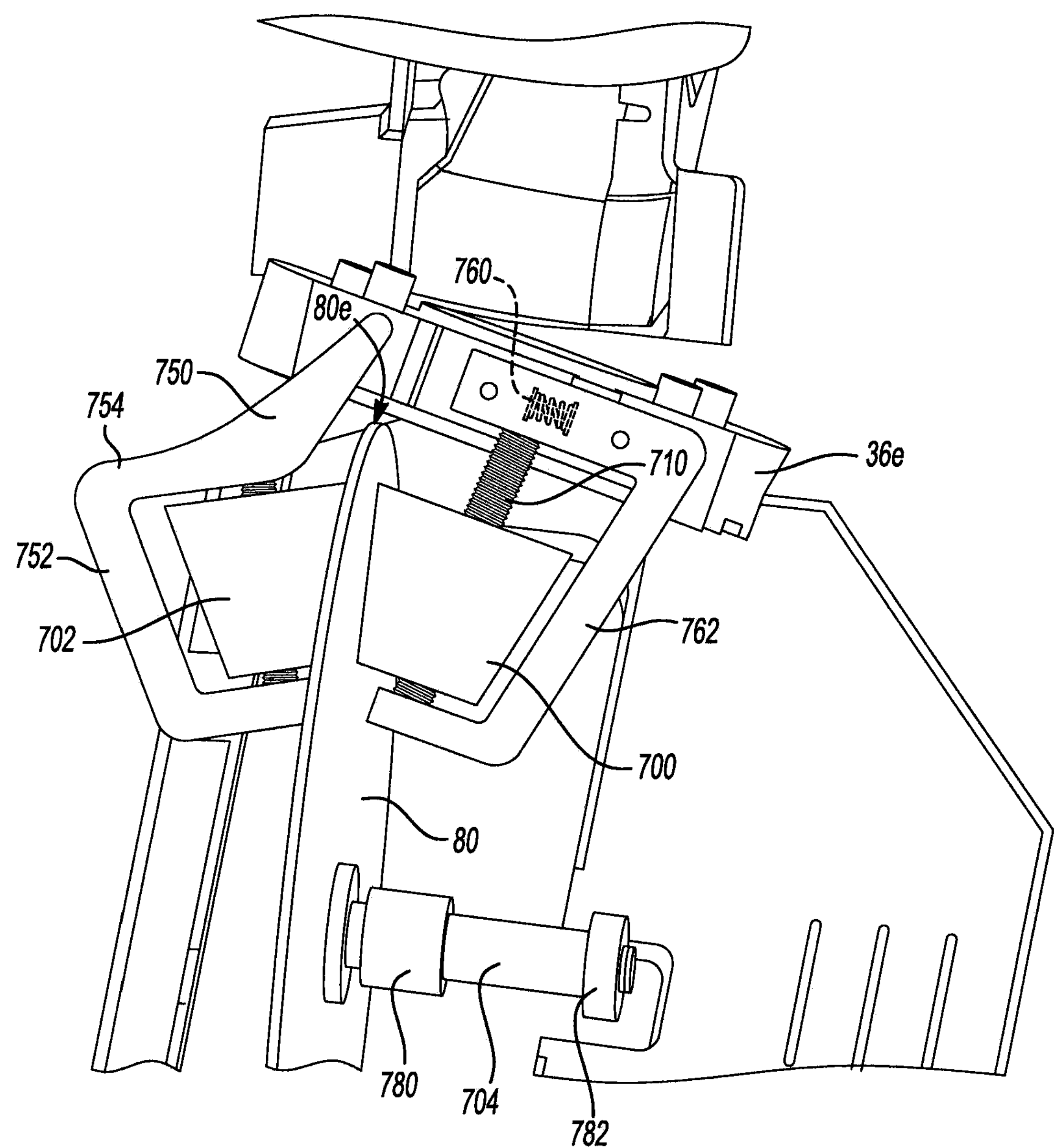

With reference to FIGS. 26 through 28, another circular saw constructed in accordance with the teachings of the present disclosure is generally indicated at reference number **10*e*. Except as noted herein, the circular saw 10*e* can be constructed in a manner that is generally similar to that of the circular saw 10 of FIGS. 1 through 4** (or any other circular saw described herein).

The circular saw **10*e* can include a drive motor assembly 14*e* that can include a motor (18*e*, FIG. 27), a transmission (20*e*, FIG. 27), an output roller 700, a reaction roller 702 and a support spindle 704. The motor 18*e* can be an AC, a DC or an AC/DC motor that can provide a rotary output that can be received by the transmission 20*e*. The transmission 20*e* can be any type of appropriate reduction mechanism, such as a gear reduction mechanism. The transmission can include a driven output member 710 to which the output roller 700 can be coupled for rotation. The output member 710, while represented as a threaded shaft can be a smooth shaft or any other rotary communication member. Accordingly, the transmission 20*e* is operable for transmitting rotary power from the motor 18*e* to the output roller 700. In another example, a transmission is not necessarily needed. If the diameter of the output roller 700 is chosen appropriately, then the needed reduction can be achieved between the output roller 700 and the blade. A reduction of approximately 4:1 to 5:1 is preferred. Thus, if the diameter of the output roller 700 is ¼ or ⅕ of the diameter of the saw blade 80 where the output roller 700** makes contact, all of the reduction will be accomplished at the roller/blade interface.

The output roller 700 can be mounted between the support spindle 704 and a circumferential edge **80*a* of a circular saw blade 80 mounted to the circular saw 10*e*. The reaction roller 702 can be mounted to the gear case 36*e* opposite the output roller 700. The reaction roller 702 can be rotatable about a reaction roller axis and can be translated and/or pivoted to move the reaction roller axis relative to a rotational axis of the output roller 700. Any suitable means can be employed to control movement of the reaction roller 702. In the example provided, the adjustment means includes a spindle 750, a yoke 752, a biasing spring (not specifically shown associated with the arms 754, but such as a biasing member 760 shown associated with an arm 762 supporting the output roller 700), and a jackscrew (not specifically shown). In this way, a biasing member may be provided on one of or both of the arms 754, 762 to assist in proper tension being applied between the rollers 700, 702 and the blade 80. The spindle 750 can be received through the reaction roller 702 and can be mounted to the arms 754 of the yoke 752. The yoke 752 can be pivotably mounted to the gear case 36*e*. The biasing spring can bias the yoke 752 in a direction that moves the reaction roller 702 toward the output roller 700. The jackscrew can be employed to pivot the yoke 752 to permit the reaction roller to be moved toward or away from the output roller 700. Alternatively, the means for moving the reaction roller 702 could include a set of ways (not shown) on which the yoke 752 can be slidably mounted. It will be appreciated that the output roller 700 and the reaction roller 702** can be shaped in any desired manner, such as generally cylindrically or a frusto-conical shape as shown in the corresponding figures.

The support spindle 704 can be mounted on bearings, such as a needle bearing 780 and a ball bearing 782 that are disposed in the gear case **36*e*. The support spindle 704 can include a coupling means, such as an internally threaded hole (not specifically shown), that permits a circular saw blade 80 to be coupled thereto. The internally threaded hole can receive a fastener 820 that can be tightened to inhibit the removal of the circular saw blade 80 from the support spindle 704**.

The reaction roller 702 can be moved away from the output roller 700 via the jackscrew to permit the circular saw blade 80 to be received therebetween and mounted on the support spindle 704. The fastener 820 can be coupled to the support spindle 704 to inhibit the removal of the circular saw blade 80 from the support spindle 704. The jackscrew can be actuated to drive the reaction roller 702 toward the output roller 700 so that the circular saw blade 80 is clamped between the reaction roller 702 and the output roller 700. Operation of the motor causes the output roller 700 to rotate. As the circular saw blade 80 is clamped between the output roller 700 and the reaction roller 702, rotation of the output roller 700 will cause corresponding rotation of the circular saw blade 80.

Figure 29:
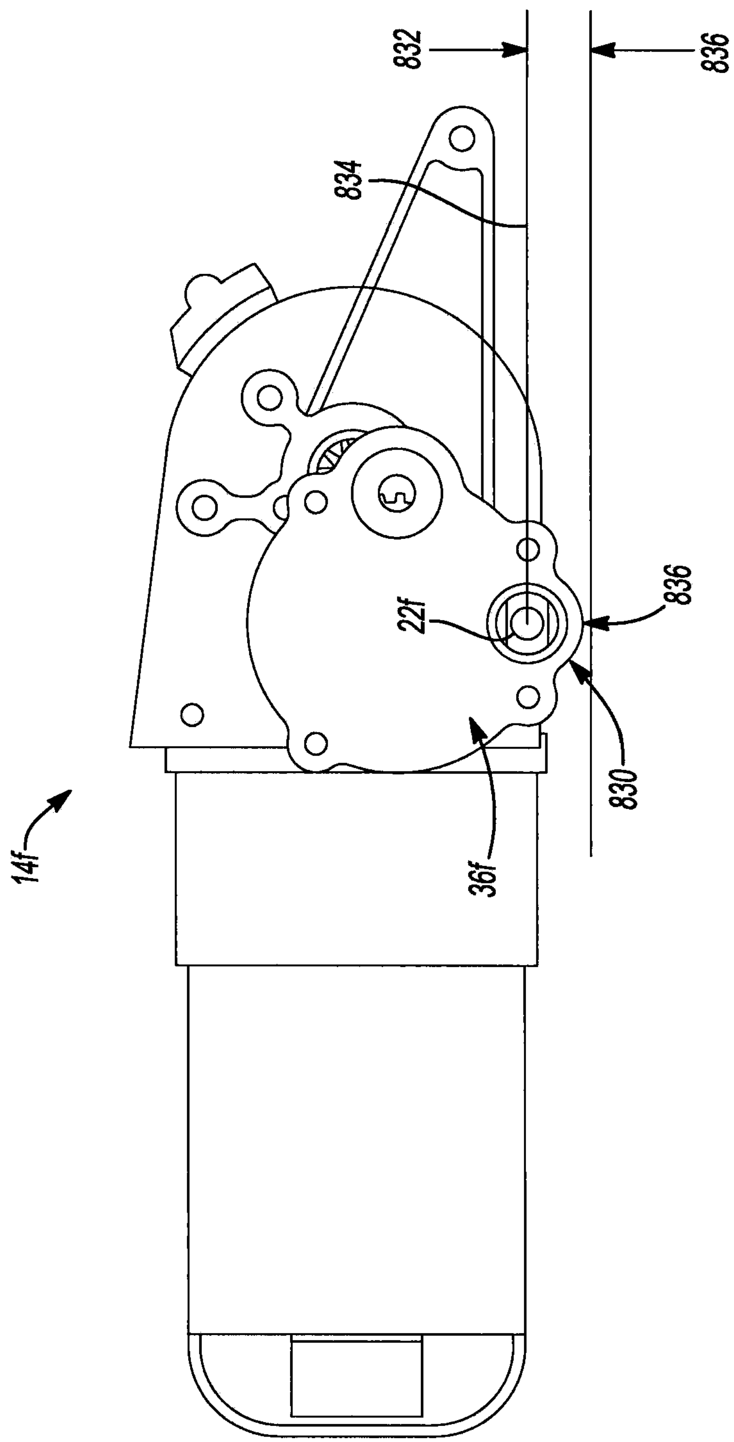
FIG. 29 is a side elevation view of a drive motor assembly constructed in accordance to one example of the present teachings.

Turning now to FIG. 29, a drive motor assembly **14*f* is shown operatively associated with a gear case 36*f*. Except as noted herein, the drive motor assembly 14*f* can be constructed in a manner that is generally similar to any of the drive motor assembly described herein. The gear case 36*f* can rotatably support an output spindle 22*f*. In one example, the output spindle 22*f* can be supported by a needle bearing 68*f*. It is appreciated that in one example, the output spindle 22*f* can be rotatably supported by a needle bearing (such as the needle bearing 68, FIG. 4). Likewise, in one example, the gear case 36*f* can provide a relatively thin sidewall in an area 830 outboard of the output spindle 22*f*. A parallel offset 832 can be defined between a centerline 834 of the output spindle 22*f* and an outermost surface 836 of the gear case 36*f* at the thin sidewall 830. The parallel offset can be about 0.625 inches or less. As can be appreciated, such a configuration can provide an output spindle that is located relatively close to a work piece, such that a saw blade (such as 80, FIG. 1**), can achieve a greater depth of cut (i.e., at least 3 inches, such as described herein with a saw blade having a 7.25 inch diameter, as described herein).

Figure 30:
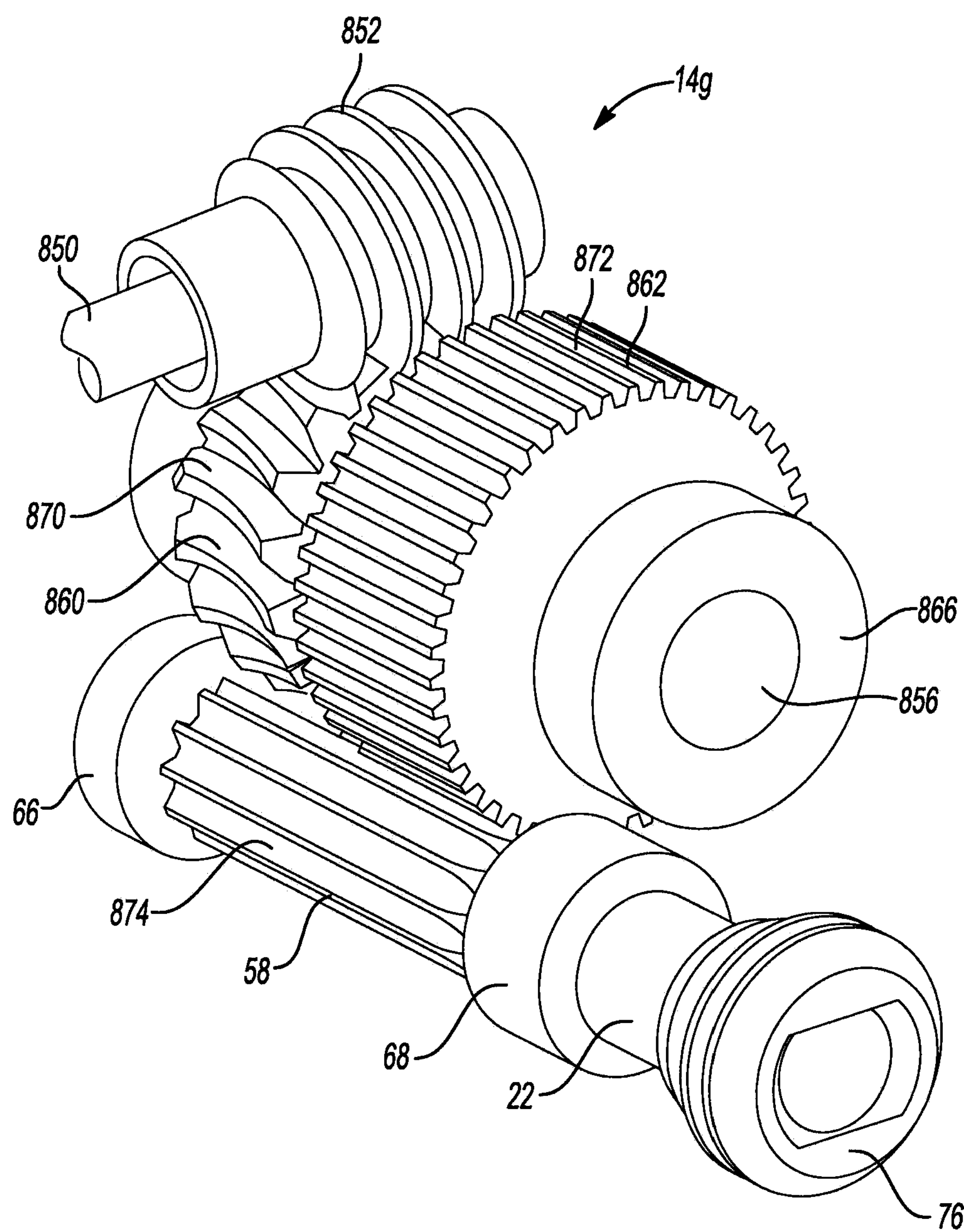
FIG. 30 is a front perspective view of a drive motor assembly according to another example of the present disclosure.
Figure 31:
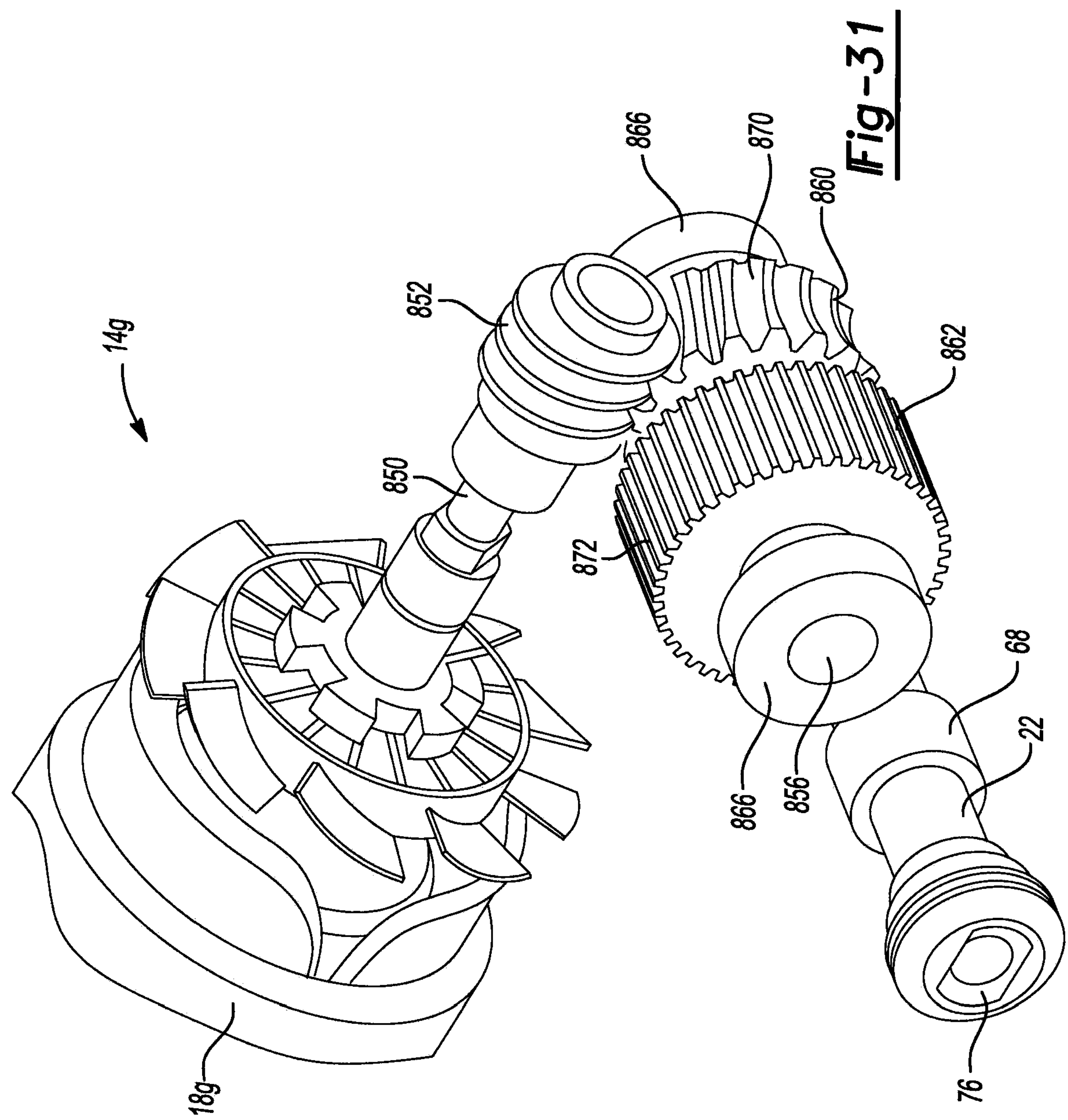
FIG. 31 is a rear perspective view of the drive motor assembly of FIG. 30.

Turning now to FIGS. 30 and 31, another drive motor assembly **14*g* constructed in accordance to the present teachings is shown. It is appreciated that the drive motor assembly 14*g* can be adapted for use with any of the circular saws described herein. As will become appreciated from the following discussion, the drive motor assembly 14*g* provides a desired gear reduction in a relatively compact space. As a result, the output spindle 22 can be located relatively closer to a work piece, such that an increased depth of cut can be achieved as discussed herein. The drive motor assembly 14*g* can include a motor 18*g* (FIG. 31) and the output spindle 22. The motor 18 can include an output shaft 850 having a worm or first worm gear 852 disposed on a distal end. The drive motor assembly 14*g* can also include an intermediate shaft 856 having a second worm gear 860 and an intermediate shaft gear 862 thereon. The first worm gear 852 can be meshed for rotation with the second worm gear 860. The intermediate shaft gear 862 can be meshed for rotation with the output gear 58 of the output spindle 22. Bearings 866 can rotatably support opposite ends of the intermediate shaft 856. The bearings 866 can be supported within a gear case (not specifically shown). According to one example of the drive motor assembly 14*g*, the intermediate shaft 856 can have less than one revolution for every one revolution of the output spindle 22. The motor output shaft 850 can be configured to rotate about five times for every one revolution of the output spindle 22. A first gear ratio can be defined between the first worm gear 852 and the second worm gear 860. A second gear ratio can be defined between the intermediate shaft gear 862 and the output gear 58. According to one example of the present configuration, the first gear ratio is greater than the second gear ratio. In one implementation, the first worm gear 852 has one worm start. The second worm gear 860 has nineteen worm teeth 870. The intermediate shaft gear 862 has forty-four teeth 872. The output gear 58 has eleven teeth 874. In one example, the first gear ratio can be 19:1 and the second gear ratio can be 11:44. Explained more generally, the first gear ratio is greater than zero and the second gear ratio is less than zero. In application, the first gear ratio slows the rotation down significantly (i.e., first worm gear 852 to the second worm gear 860) and the second gear ratio, speeds up the rotation (i.e., intermediate shaft gear 862 to the output gear 58). The configuration of the drive motor assembly 14*g* is such that the intermediate shaft 856 rotates slower than the output spindle 22. It would be very difficult to design to 3" depth-of-cut saw without this feature because a relatively small output gear 58** is preferred to help with packaging. Those skilled in the art will appreciate that other configurations providing other ratios are contemplated.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

The invention claimed is:

1. A circular saw comprising:
- a housing assembly having a nose containing an output spindle;
- a circular saw blade having a diameter, the circular saw blade being mounted to the output spindle;
- a shoe adjustably mounted to the housing assembly, the shoe having a blade aperture to accommodate the circular saw blade and a nose aperture to accommodate the nose,
- the saw capable of providing a depth of cut;
- a ratio of the saw blade diameter to the depth of cut being 2.4 or less to 1.

2. A circular saw as set forth in claim 1 further comprising an output spindle coupled to the saw blade and at least one additional shaft that drives the output spindle, directly or indirectly, wherein the output spindle rotates faster than the at least one additional shaft when the output spindle drives the saw blade.

3. A circular saw as set forth in claim 1 further comprising a transmission comprising an output gear and at least one additional gear wherein a gear multiplication is defined from the at least one additional gear to the output gear.

4. A circular saw as set forth in claim 1 further comprising an output spindle coupled to the saw blade and a needle bearing, adjacent to the saw blade, rotatably supporting an end of the output spindle.

5. A circular saw as set forth in claim 4, further comprising:
- a seal, and
- a case member including an aperture and a seal groove formed in a surface of the case member, at least part of the seal groove extending about an outer periphery of the aperture and formed without an inner wall about the outer periphery of the aperture, the needle bearing received in the aperture and positioned to form a wall cooperating with an outer wall of the seal groove about the outer periphery of the aperture to capture the seal.

6. A circular saw as set forth in claim 4, further comprising an output gear about the output spindle, the output gear having an outside diameter, and wherein the needle bearing has an inside diameter, the needle bearing inside diameter being greater than the output gear outside diameter.

7. A circular saw as set forth in claim 2, further comprising a motor output shaft, wherein the motor output shaft rotates faster than the output spindle.

8. A circular saw as set forth in claim 2, further comprising a first worm gear on the motor output shaft and a second worm gear on the at least one additional shaft, the first worm gear driving the second worm gear, the worm gears configured to define a gear reduction from the first worm gear to the second worm gear.

9. A circular saw as set forth in claim 1, further comprising a blade guard assembly including a lower guard member and a needle bearing, the lower guard member including a bearing hub and an aperture in the bearing hub configured to receive the needle bearing.

* * * * *